United States Patent
Choi

(10) Patent No.: US 10,986,315 B2
(45) Date of Patent: Apr. 20, 2021

(54) PIXEL ARRAY INCLUDED IN IMAGE SENSOR, IMAGE SENSOR INCLUDING THE SAME AND ELECTRONIC SYSTEM INCLUDING THE SAME

(71) Applicant: SAMSUNG ELECTRONICS CO., LTD., Suwon-si (KR)

(72) Inventor: Woo-Seok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/668,681

(22) Filed: Oct. 30, 2019

(65) Prior Publication Data

US 2020/0260055 A1 Aug. 13, 2020

(30) Foreign Application Priority Data

Feb. 11, 2019 (KR) ........................ 10-2019-0015619

(51) Int. Cl.
*H04N 5/225* (2006.01)
*H04N 9/04* (2006.01)
*H04N 9/64* (2006.01)

(52) U.S. Cl.
CPC ............. *H04N 9/0451* (2018.08); *H04N 9/64* (2013.01)

(58) Field of Classification Search
CPC .... H04N 5/374; H04N 9/0455; H04N 9/0451; H04N 9/64; H04N 9/04555; H01L 27/14621; H01L 27/14625; H01L 27/14627; H01L 27/14645; H01L 27/14685

See application file for complete search history.

(56) References Cited

U.S. PATENT DOCUMENTS

| | | | |
|---|---|---|---|
| 7,522,341 B2 | 4/2009 | Mouli | |
| 9,591,244 B2 | 3/2017 | Tanaka | |
| 9,736,353 B2 | 8/2017 | Jo | |
| 9,911,768 B2 | 3/2018 | Nakamura | |
| 10,063,764 B2 | 8/2018 | Fukuda | |
| 2007/0014019 A1* | 1/2007 | Mouli | G02B 3/0018 |
| | | | 359/619 |
| 2011/0019041 A1* | 1/2011 | Ishiwata | H01L 27/14612 |
| | | | 348/280 |

(Continued)

FOREIGN PATENT DOCUMENTS

| | | |
|---|---|---|
| JP | 2012-182824 A | 9/2012 |
| JP | 2017-073681 A | 4/2017 |

*Primary Examiner* — Kelly L Jerabek
(74) *Attorney, Agent, or Firm* — Lee IP Law, PC

(57) ABSTRACT

A pixel array in an image sensor includes first, second, third, and fourth pixel groups adjacent to each other. The first pixel group includes a plurality of first subpixels adjacent to each other and arranged in a first pattern, and a first microlens shared by the plurality of first subpixels. The second pixel group includes a plurality of second subpixels adjacent to each other and arranged in a second pattern, and a second microlens shared by the plurality of second subpixels. The third pixel group includes a plurality of third subpixels adjacent to each other and arranged in a third pattern, and a third microlens shared by the plurality of third subpixels. The fourth pixel group includes a plurality of fourth subpixels adjacent to each other and arranged in a fourth pattern, and a fourth microlens shared by the plurality of fourth subpixels.

17 Claims, 37 Drawing Sheets

(56) References Cited

U.S. PATENT DOCUMENTS

| | | | |
|---|---|---|---|
| 2012/0033120 A1* | 2/2012 | Nakamura | H04N 9/04557 348/302 |
| 2013/0222553 A1* | 8/2013 | Tsuchita | H04N 13/257 348/49 |
| 2014/0285627 A1* | 9/2014 | Kuboi | H04N 5/238 348/46 |
| 2015/0062391 A1* | 3/2015 | Murata | H04N 5/36961 348/280 |
| 2015/0264335 A1 | 9/2015 | Park | |
| 2017/0171470 A1* | 6/2017 | Sakioka | H04N 5/3745 |
| 2018/0006078 A1* | 1/2018 | Fereyre | H01L 27/14621 |
| 2019/0326341 A1* | 10/2019 | Gravelle, Jr. | G02B 3/0037 |

* cited by examiner

FIG. 6C

PG_IMG2

| | GS22 | | GS42 | |
| --- | --- | --- | --- | --- |
| | | GS23 | | GS43 |
| | GS12 | | GS32 | |
| | | GS13 | | GS33 |

PG_IMG1

| | GB21 | | GB41 | |
| --- | --- | --- | --- | --- |
| | | GB24 | | GB44 |
| | | GB14 | | GB34 |
| GB11 | | GB31 | | |

FIG. 6D

| GS22 | gs24 | GS42 | gs44 |
|------|------|------|------|
| gs21 | GS23 | gs41 | GS43 |
| GS12 | gs14 | GS32 | gs34 |
| gs11 | GS13 | gs31 | GS33 |

IG_IMG2

| gb22 | GB24 | gb42 | GB44 |
|------|------|------|------|
| GB21 | gb23 | GB41 | gb43 |
| gb12 | GB14 | gb32 | GB34 |
| GB11 | gb13 | GB31 | gb33 |

IG_IMG1

FIG. 9A

CG_IMG

| GB11' <br> (=α11*GB11) | GS12' <br> (=β12*GS12) | GB21' <br> (=α21*GB21) | GS22' <br> (=β22*GS22) |
| --- | --- | --- | --- |
| GS13' <br> (=β13*GS13) | GB14' <br> (=α14*GB14) | GS23' <br> (=β23*GS23) | GB24' <br> (=α24*GB24) |
| GB31' <br> (=α31*GB31) | GS32' <br> (=β32*GS32) | GB41' <br> (=α41*GB41) | GS42' <br> (=β42*GS42) |
| GS33' <br> (=β33*GS33) | GB34' <br> (=α34*GB34) | GS43' <br> (=β43*GS43) | GB44' <br> (=α44*GB44) |

FIG. 10C

| PR_IMG1 | | | |
|---|---|---|---|
| R11Q1 | | R21Q1 | |
| | | | |
| R31Q1 | | R41Q1 | |
| | | | |

| PR_IMG2 | | | |
|---|---|---|---|
| | R12Q2 | | R22Q2 |
| | | | |
| | R32Q2 | | R42Q2 |
| | | | |

| PR_IMG3 | | | |
|---|---|---|---|
| | | | |
| R13Q4 | | R23Q4 | |
| | | | |
| R33Q4 | | R43Q4 | |

| PR_IMG4 | | | |
|---|---|---|---|
| | | | |
| | R14Q3 | | R24Q3 |
| | | | |
| | R34Q3 | | R44Q3 |

FIG. 10D

IR_IMG1

| R11Q1 | r12q1 | R21Q1 | r22q1 |
|---|---|---|---|
| r13q1 | r14q1 | r23q1 | r24q1 |
| R31Q1 | r32q1 | R41Q1 | r42q1 |
| r33q1 | r34q1 | r43q1 | r44q1 |

IR_IMG2

| r11q2 | R12Q2 | r21q2 | R22Q2 |
|---|---|---|---|
| r13q2 | r14q2 | r23q2 | r24q2 |
| r31q2 | R32Q2 | r41q2 | R42Q2 |
| r33q2 | r34q2 | r43q2 | r44q2 |

IR_IMG3

| r11q4 | r12q4 | r21q4 | r22q4 |
|---|---|---|---|
| R13Q4 | r14q4 | R23Q4 | r24q4 |
| r31q4 | r32q4 | r41q4 | r42q4 |
| R33Q4 | r34q4 | R43Q4 | r44q4 |

IR_IMG4

| r11q3 | r12q3 | r21q3 | r22q3 |
|---|---|---|---|
| r13q3 | R14Q3 | r23q3 | R24Q3 |
| r31q3 | r32q3 | r41q3 | r42q3 |
| r33q3 | R34Q3 | r43q3 | R44Q3 |

FIG. 10E

|  |  | TR_IMG1 |  |
|---|---|---|---|
| RT11 | RT12 | RT21 | RT22 |
| RT13 | RT14 | RT23 | RT24 |
| RT31 | RT32 | RT41 | RT42 |
| RT33 | RT34 | RT43 | RT44 |

FIG. 15C

PB_IMG1''

| | | | |
|---|---|---|---|
| | | | |
| | BL23 | | BL43 |
| | | | |
| | BL13 | | BL33 |

PB_IMG2''

| | | | |
|---|---|---|---|
| | BR24 | | BR44 |
| | | | |
| | BR14 | | BR34 |
| | | | |

FIG. 15E

| | | TB_IMG1" | |
|---|---|---|---|
| BT11 | BT12 | BT21 | BT22 |
| BT13 | BT14 | BT23 | BT24 |
| BT31 | BT32 | BT41 | BT42 |
| BT33 | BT34 | BT43 | BT44 |

PIXEL ARRAY INCLUDED IN IMAGE SENSOR, IMAGE SENSOR INCLUDING THE SAME AND ELECTRONIC SYSTEM INCLUDING THE SAME

CROSS-REFERENCE TO RELATED APPLICATION

Korean Patent Application No. 10-2019-0015619, filed on Feb. 11, 2019, in the Korean Intellectual Property Office, and entitled: "Pixel Array Included in Image Sensor, Image Sensor Including the Same and Electronic System Including the Same," is incorporated by reference herein in its entirety.

BACKGROUND

1. Field

Example embodiments relate generally to image sensors, and more particularly to pixel arrays included in image sensors, image sensors including the pixel arrays, and electronic systems including the image sensors.

2. Description of the Related Art

A complementary metal oxide semiconductor (CMOS) image sensor is an image pickup device manufactured using CMOS processes. The CMOS image sensor has lower manufacturing cost and smaller pixel size than a charge coupled device (CCD) image sensor having a high-voltage analog circuit and thus has an advantage of low power consumption. In addition, with the improvement of the performance of CMOS image sensors, CMOS image sensors are widely used for mobile electronic devices such as smart phones, tablet personal computers (PCs), and digital cameras.

SUMMARY

According to example embodiments, a pixel array included in an image sensor includes a first pixel group, a second pixel group, a third pixel group and a fourth pixel group. The first pixel group includes a plurality of first subpixels adjacent to each other and arranged in a first pattern, and a first microlens shared by the plurality of first subpixels. The second pixel group is adjacent to the first pixel group, and includes a plurality of second subpixels adjacent to each other and arranged in a second pattern different from the first pattern, and a second microlens shared by the plurality of second subpixels. The third pixel group is adjacent to the first pixel group, and includes a plurality of third subpixels adjacent to each other and arranged in a third pattern different from the first and second patterns, and a third microlens shared by the plurality of third subpixels. The fourth pixel group is adjacent to the second and third pixel groups, and includes a plurality of fourth subpixels adjacent to each other and arranged in a fourth pattern different from the first, second, and third patterns, and a fourth microlens shared by the plurality of fourth subpixels.

According to example embodiments, an image sensor includes a pixel array and a plurality of column driving circuits. The pixel array generates a plurality of analog pixel signals based on incident light. The plurality of column driving circuits are connected to a plurality of columns of the pixel array and convert the plurality of analog pixel signals into a plurality of digital signals. The pixel array includes a first pixel group, a second pixel group, a third pixel group and a fourth pixel group. The first pixel group includes a plurality of first subpixels adjacent to each other and arranged in a first pattern, and a first microlens shared by the plurality of first subpixels. The second pixel group is adjacent to the first pixel group, and includes a plurality of second subpixels adjacent to each other and arranged in a second pattern different from the first pattern, and a second microlens shared by the plurality of second subpixels. The third pixel group is adjacent to the first pixel group, and includes a plurality of third subpixels adjacent to each other and arranged in a third pattern different from the first and second patterns, and a third microlens shared by the plurality of third subpixels. The fourth pixel group is adjacent to the second and third pixel groups, and includes a plurality of fourth subpixels adjacent to each other and arranged in a fourth pattern different from the first, second, and third patterns, and a fourth microlens shared by the plurality of fourth subpixels.

According to example embodiments, an electronic system includes an image sensor and a processor. The image sensor includes a pixel array and generates a plurality of digital signals based on incident light. The processor controls an operation of the image sensor. The pixel array includes a first pixel group, a second pixel group, a third pixel group and a fourth pixel group. The first pixel group includes a plurality of first subpixels adjacent to each other and arranged in a first pattern, and a first microlens shared by the plurality of first subpixels. The second pixel group is adjacent to the first pixel group, and includes a plurality of second subpixels adjacent to each other and arranged in a second pattern different from the first pattern, and a second microlens shared by the plurality of second subpixels. The third pixel group is adjacent to the first pixel group, and includes a plurality of third subpixels adjacent to each other and arranged in a third pattern different from the first and second patterns, and a third microlens shared by the plurality of third subpixels. The fourth pixel group is adjacent to the second and third pixel groups, and includes a plurality of fourth subpixels adjacent to each other and arranged in a fourth pattern different from the first, second, and third patterns, and a fourth microlens shared by the plurality of fourth subpixels.

BRIEF DESCRIPTION OF THE DRAWINGS

Features will become apparent to those of skill in the art by describing in detail exemplary embodiments with reference to the attached drawings in which:

FIGS. 6A, 6B, 6C, 6D and 6E illustrate diagrams for describing the method of processing the image of FIGS. 4 and 5.

FIGS. 8A, 8B, 8C, 9A and 9B illustrate diagrams for describing the method of processing the image of FIGS. 4 and 7.

FIGS. 10A, 10B, 10C, 10D and 10E illustrate diagrams for describing the method of processing the image of FIGS. 4 and 5.

FIGS. 14A, 14B, 15A, 15B, 15C, 15D and 15E illustrate diagrams for describing the method of processing the image of FIGS. 4 and 5.

DETAILED DESCRIPTION

Figure 1:
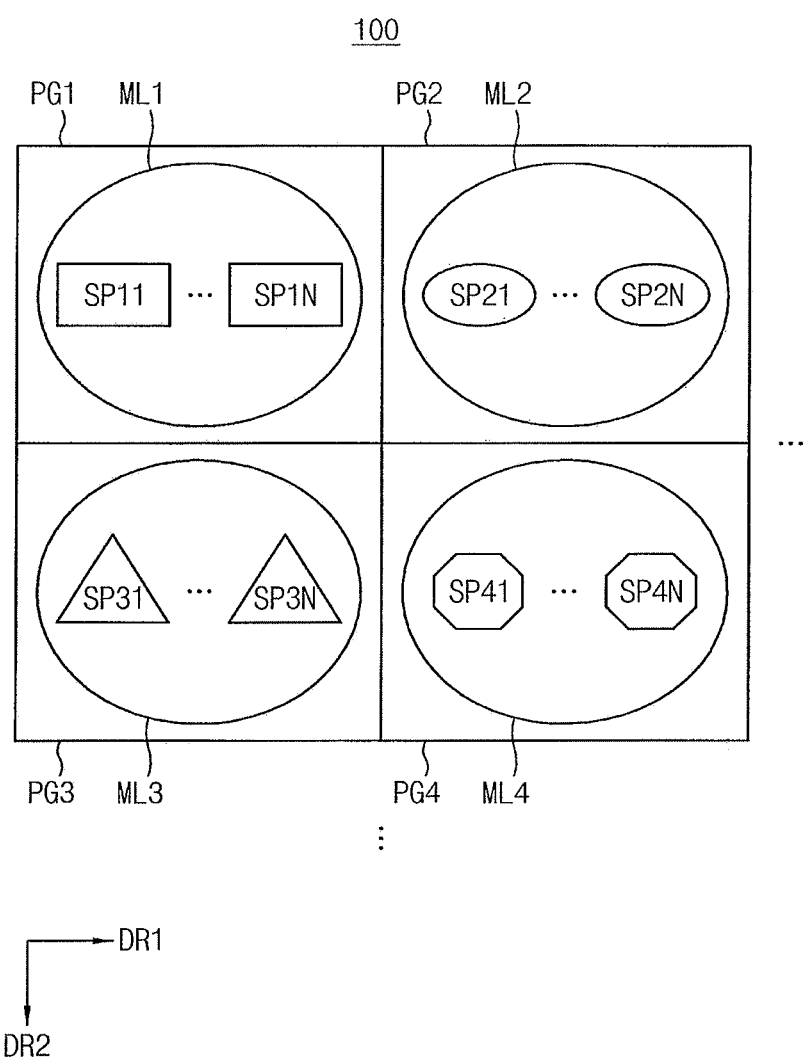
FIG. 1 illustrates a plan view of a pixel array included in an image sensor according to example embodiments.

FIG. 1 is a plan view of a pixel array included in an image sensor according to example embodiments. Referring to FIG. 1, a pixel array 100 included in an image sensor includes a first pixel group PG1, a second pixel group PG2, a third pixel group PG3 and a fourth pixel group PG4. The first through fourth pixel groups PG1~PG4 may be adjacent to each other and arranged in a 2*2 matrix formation.

The first pixel group PG1 includes a plurality of first subpixels SP11, . . . , SP1N adjacent, e.g., immediately adjacent, to each other and arranged in a first pattern and a first microlens ML1 shared by the plurality of first subpixels SP11~SP1N.

The second pixel group PG2 is adjacent, e.g., immediately adjacent, to the first pixel group PG1 along a first direction DR1. The second pixel group PG2 includes a plurality of second subpixels SP21, . . . , SP2N adjacent, e.g., immediately adjacent, to each other and arranged in a second pattern different from the first pattern, and a second microlens ML2 that is shared by the plurality of second subpixels SP21~SP2N.

The third pixel group PG3 is adjacent, e.g., immediately adjacent, to the first pixel group PG1 along a second direction DR2 crossing (e.g., perpendicular to) the first direction DR1. The third pixel group PG3 includes a plurality of third subpixels SP31, . . . , SP3N adjacent, e.g., immediately adjacent, to each other and arranged in a third pattern different from the first and second patterns, and a third microlens ML3 that is shared by the plurality of third subpixels SP31~SP3N.

The fourth pixel group PG4 is adjacent, e.g., immediately adjacent, to the second and third pixel groups PG2 and PG3. The fourth pixel group PG4 includes a plurality of fourth subpixels SP41, . . . , SP4N adjacent, e.g., immediately adjacent, to each other and arranged in a fourth pattern different from the first, second and third patterns, and a fourth microlens ML4 that is shared by the plurality of fourth subpixels SP41~SP4N.

As described above, in the pixel array 100 included in the image sensor according to example embodiments, a plurality of subpixels included in one pixel group, e.g., all of the subpixels of the pixel group, may share one microlens. Although the subpixels SP11~SP1N, SP21~SP2N, SP31~SP3N and SP41~SP4N have different shapes in FIG. 1 for convenience of illustration, descriptions that subpixels are arranged in different patterns indicate that positions and/or arrangements of subpixels are different in a plane or plan view. For example, a color arrangement of subpixels (e.g., an arrangement of color filters) may be different, as described below.

In some example embodiments, the microlenses ML1~ML4 may be formed on the subpixels SP11~SP1N, SP21~SP2N, SP31~SP3N and SP41~SP4N, respectively. For example, the microlens ML1 may be on a surface where the incident light is received, and the subpixels SP11~SP1N may be under the microlens ML1.

In some example embodiments, the first through fourth pixel groups PG1~PG4 may include the same number of subpixels (e.g., N subpixels where N is a natural number greater than or equal to two), e.g., four or more subpixels.

Although FIG. 1 illustrates that the pixel array 100 includes only four pixel groups PG1~PG4, the pixel groups PG1~PG4 may be repeatedly arranged along the first and second directions DR1 and DR2, additional pixel group types may be employed, or an arrangement of individual pixel groups PG1~PG4 within the four pixel group may be varied.

Figure 2:
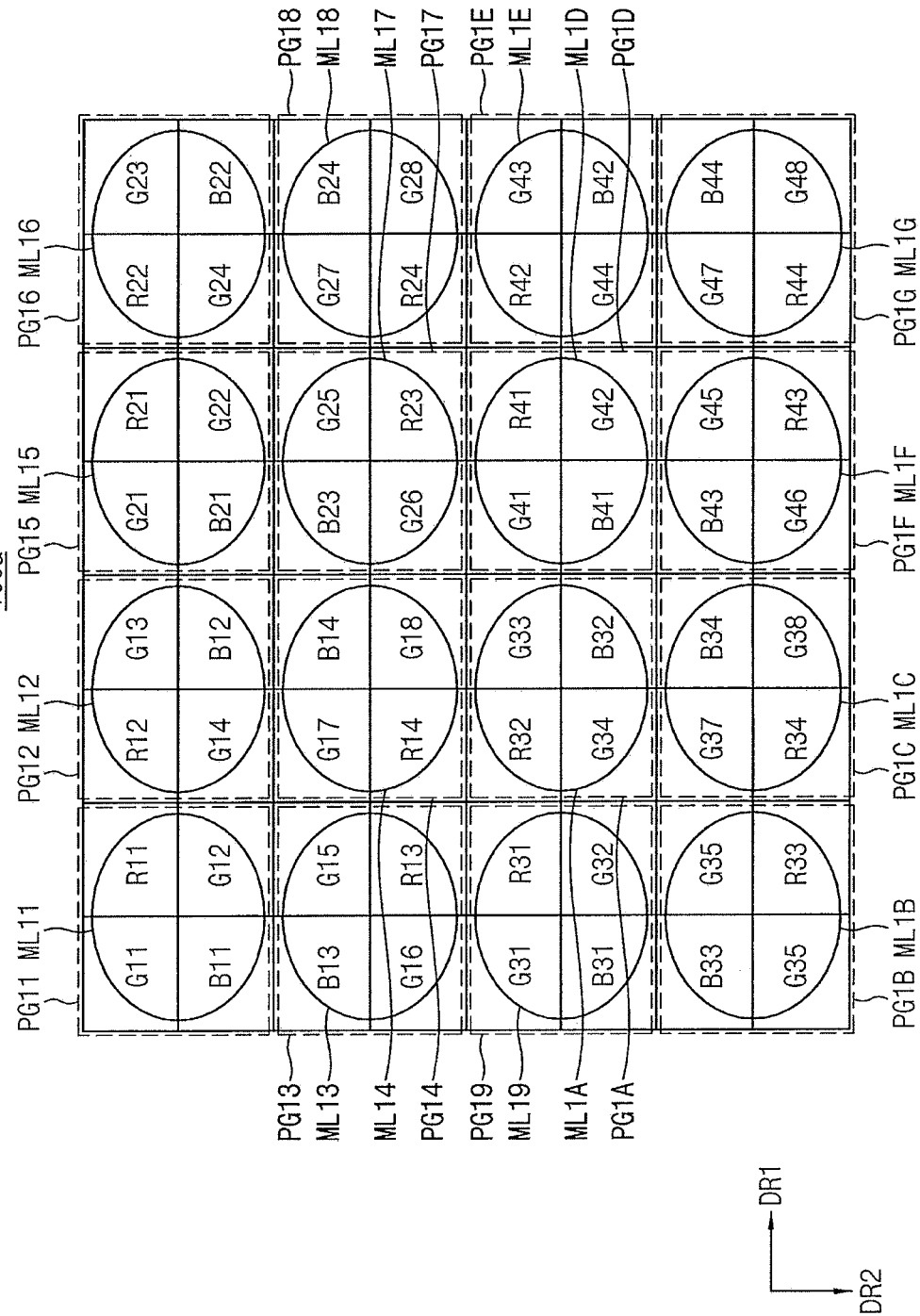
FIG. 2 illustrates a plan view of an example of the pixel array of FIG. 1.

FIG. 2 is a plan view of an example of the pixel array of FIG. 1. Referring to FIG. 2, a pixel array 100a included in an image sensor includes a plurality of pixel groups PG11, PG12, PG13, PG14, PG15, PG16, PG17, PG18, PG19, PG1A, PG1B, PG1C, PG1D, PG1E, PG1F and PG1G.

The pixel array 100a of FIG. 2 represents an example where one pixel group includes four subpixels (N=4). In an example, one pixel group includes two green pixels, one red pixel, and one blue pixel. A configuration of the pixel array 100a of FIG. 2 will be described in detail with respect to first through fourth pixel groups PG11~PG14 arranged in a 2*2 matrix.

The first pixel group PG11 includes four subpixels (e.g., a first green pixel G11, a first red pixel R11, a first blue pixel B11 and a second green pixel G12) arranged in the 2*2 matrix, and a first microlens ML11 that is shared by the subpixels G11, R11, B11 and G12 in the first pixel group PG11. The subpixels G11, R11, B11 and G12 may be arranged in a pattern of GRBG.

The second pixel group PG12 includes four subpixels (e.g., a second red pixel R12, a third green pixel G13, a fourth green pixel G14 and a second blue pixel B12) arranged in the 2*2 matrix formation, and a second microlens ML12 that is shared by the subpixels R12, G13, G14 and B12 in the second pixel group PG12. The subpixels R12, G13, G14 and B12 may be arranged in a pattern of RGGB.

The third pixel group PG13 includes four subpixels (e.g., a third blue pixel B13, a fifth green pixel G15, a sixth green pixel G16 and a third red pixel R13) arranged in the 2*2 matrix formation, and a third microlens ML13 that is shared by the subpixels B13, G15, G16 and R13 in the third pixel group PG13. The subpixels B13, G15, G16 and R13 may be arranged in a pattern of BGGR.

The fourth pixel group PG14 includes four subpixels (e.g., a seventh green pixel G17, a fourth blue pixel B14, a fourth red pixel R14 and an eighth green pixel G18) arranged in the 2*2 matrix formation, and a fourth microlens ML14 that is shared by the subpixels G17, B14, R14 and G18 in the fourth pixel group PG14. The subpixels G17, B14, R14 and G18 may be arranged in a pattern of GBRG.

A center of each microlens (e.g., the first microlens ML11) may coincide or match with a center of each pixel group (e.g., the first pixel group PG11), and may coincide or match with vertices of subpixels in each pixel group (e.g., the subpixels G11, R11, B11 and G12 in the first pixel group PG11). In this case, a size of color filter patterns of the subpixels may become larger, and thus it may be advantageous for a fine process.

Two green pixels in one pixel group may be diagonally arranged with respect to each other. For example, the green pixels G11 and G12 in the pixel group PG11 may be arranged in a first diagonal direction, the green pixels G13 and G14 in the pixel group PG12 may be arranged in a second diagonal direction different from the first diagonal direction, the green pixels G15 and G16 in the pixel group PG13 may be arranged in the second diagonal direction, and the green pixels G17 and G18 in the pixel group PG14 may be arranged in the first diagonal direction. In other words, a first arrangement of the first and second green pixels G11 and G12 in the first pixel group PG11 may be different from a second arrangement of the third and fourth green pixels G13 and G14 in the second pixel group PG12, a third arrangement of the fifth and sixth green pixels G15 and G16 in the third pixel group PG13 may be substantially the same as the second arrangement, and a fourth arrangement of the seventh and eighth green pixels G17 and G18 in the fourth pixel group PG14 may be substantially the same as the first arrangement.

Positions of the red pixels R11, R12, R13 and R14 in the pixel groups PG11~PG14 may be different from each other. In other words, a first location of the first red pixel R11 in the first pixel group PG11, a second location of the second red pixel R12 in the second pixel group PG12, a third location of the third red pixel R13 in the third pixel group PG13, and a fourth location of the fourth red pixel R14 in the fourth pixel group PG14 may be different from each other. For example, with respect to a center of each microlens, the first position may be in a first quadrant, the second position may be in a second quadrant, the third position may be in a fourth quadrant, and the fourth position may be in a third quadrant. Similarly, positions of the blue pixels B11, B12, B13 and B14 in the pixel groups PG11~PG14 may be different from each other.

A configuration of subpixels G21, G22, G23, G24, G25, G26, G27, G28, R21, R22, R23, R24, B21, B22, B23 and B24 and microlenses ML15, ML16, ML17 and ML18 included in the pixel groups PG15-PG18, a configuration of subpixels G31, G32, G33, G34, G35, G36, G37, G38, R31, R32, R33, R34, B31, B32, B33 and B34 and microlenses ML19, ML1A, ML1B and ML1C included in the pixel groups PG19-PG1C, and a configuration of subpixels G41, G42, G43, G44, G45, G46, G47, G48, R41, R42, R43, R44, B41, B42, B43 and B44 and microlenses ML1D, ML1E, ML1F and ML1G included in the pixel groups PG1D-PG1G may be substantially the same as a configuration of the subpixels G11, G12, G13, G14, G15, G16, G17, G18, R11, R12, R13, R14, B11, B12, B13 and B14 and the microlenses ML11, ML12, ML13 and ML14 included in the pixel groups PG11-PG14, respectively.

In some example embodiments, the second, fourth, fifth and seventh green pixels G12, G14, G15 and G17 included in different pixel groups may be arranged adjacent to each other. In this case, the image sensor including the pixel array 100a may be driven in an operation mode in which signals of neighboring subpixels G12, G14, G15 and G17 having the same color are summed (or combined) and output as one signal. Similarly, the blue pixels B12, B21, B14 and B23 included in different pixel groups may be arranged adjacent to each other, and the red pixels R13, R14, R31 and R32 included in different pixel groups may be arranged adjacent to each other.

In summary, the pixel array 100a may include a plurality of pixel groups each of which includes four subpixels formed under one microlens, each subpixel may detect one of three colors of red, green and blue, and one pixel group may include one red pixel, one blue pixel and two green pixels, the two green pixels being diagonally arranged with respect to each other. When comparing four neighboring pixel groups, the color pattern of each pixel group may be different from each other. In particular, when four neighboring pixel groups are defined as one unit, red pixels may be located in each of first through fourth quadrants with respect to the center of each microlens by one, blue pixels may be located in each of first through fourth quadrants with respect to the center of each microlens by one, and green pixels may be located in each of first through fourth quadrants with respect to the center of each microlens by two.

FIGS. 3A, 3B, 3C, 3D, 3E, 3F, 3G and 3H are diagrams for describing an operation of the pixel array of FIG. 2.

Figure 3A:
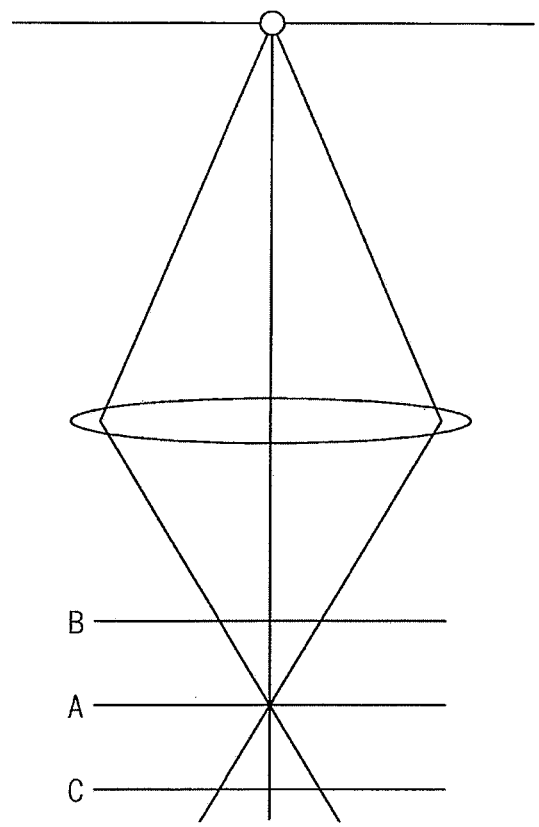
FIGS. 3A, 3B, 3C, 3D, 3E, 3F, 3G and 3H illustrate diagrams for describing an operation of the pixel array of FIG. 2.

FIG. 3A shows a state of an image from a point light source according to a focus state of a lens. On an "A" plane which is an in-focus plane, the image from the point light source becomes a single point. On "B" and "C" planes which are out-of-focus or defocus planes, the image from the point light source is formed in a shape of a circle with a diameter proportional to the defocus degree.

Figure 3B:
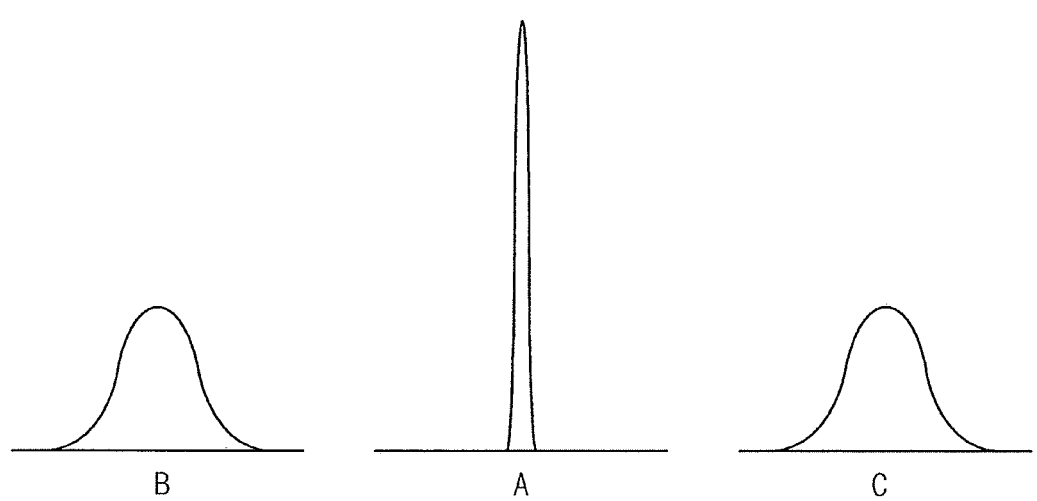

FIG. 3B is a cross-sectional view of a point spread function (PSF) on each of the "A," "B" and "C" planes in FIG. 3A. On the "A" plane, the PSF is narrow with a high intensity. On the "B" and "C" planes, the PSF is wide with a low intensity.

Figure 3C:
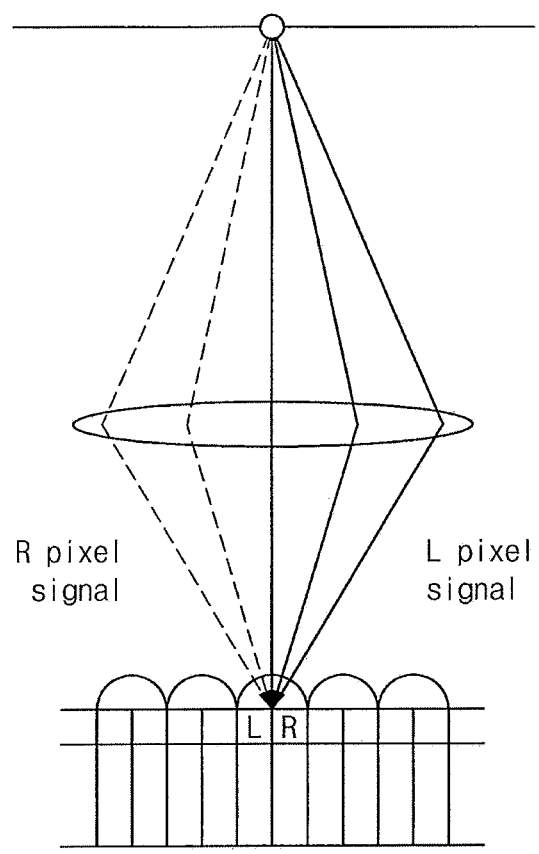

FIG. 3C illustrates a dual pixel image sensor used for performing focus detection. Two subpixels "L" and "R" are under one microlens and detect light rays (e.g., illustrated by solid lines) passing through a right area of a lens and light rays (e.g., illustrated by dotted lines) passing through a left area of the lens, respectively.

Figure 3D:
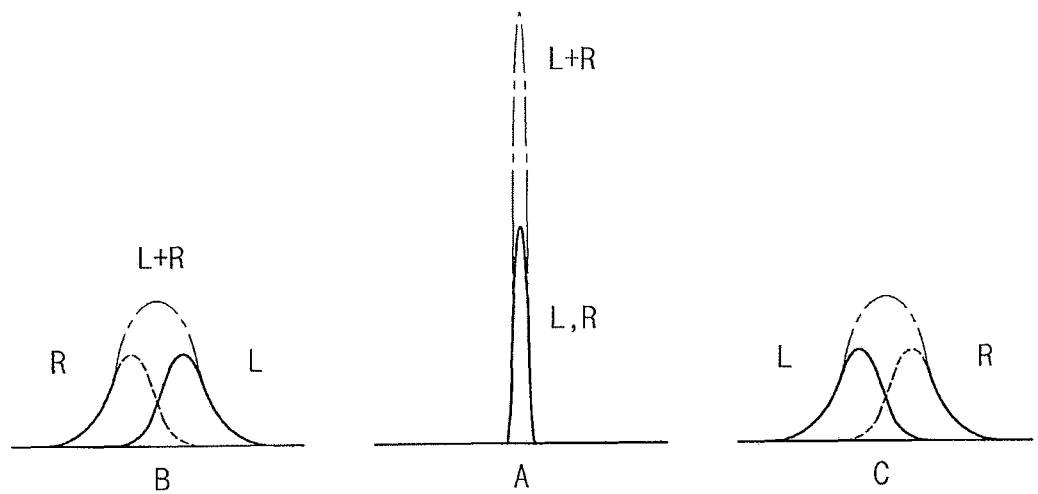

FIG. 3D shows a principle of detecting a focus state and an image in a dual pixel image sensor. In the focused state "A" in FIG. 3A, both the "L" pixel and the "R" pixel detect a focused image, i.e., the PSFs measured by the "L" and "R" pixels have the same shape and size in a form of a point. In the unfocused state "B" in FIG. 3A where the image sensor in front of the focus, the PSF detected by the "R" pixel is shifted to the left and the PSF detected by the "L" pixel is shifted to the right. On the contrary, in the unfocused state "C" in FIG. 3A where the image sensor is in back of the focus, the PSF detected by the "R" pixel is shifted to the right and the PSF detected by the "L" pixel is shifted to the left. Since the degree of the PSF of each pixel is proportional to the degree of defocus of the image in the B and C states, the current focus state may be measured by analyzing the image from the "L" pixel and the image from the "R" pixel. In addition, when the PSFs detected by the "L" and "R" pixels are summed in any cases, the summed PSF is substantially the same as the PSF in FIG. 3B. In other words, the sum of the signals of the "L" and "R" pixels gives the same image as that obtained from an image sensor with one pixel under one microlens.

Figure 3E:
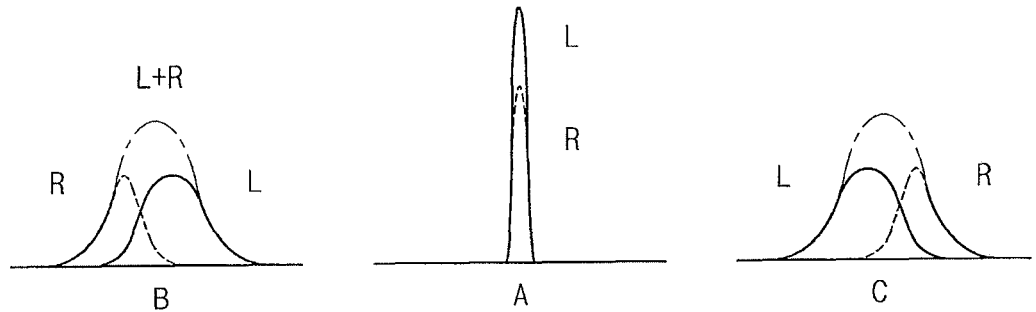

FIG. 3E shows an example where there is an error or misalignment between a position of the center of the microlens and positions of the subpixels in the dual pixel image sensor. For example, when the microlens is slightly shifted towards the "L" pixel, the amount of light detected by the "L" pixel is greater than the amount of light detected by the "R" pixel. Thus, in the focused state "A," the PSF detected by the "L" pixel and the PSF detected by the "R" pixel are substantially similar in shape, but the intensity of the PSF of the "L" pixel becomes larger. In the unfocused state "B" or the unfocused state "C," a width of the PSF detected by the "L" pixel is greater than a width of the PSF detected by the "R" pixel. However, the sum of the PSFs detected by the "L" and "R" pixels in any cases provides the PSF detected by the image sensor with one pixel under one microlens.

Figure 3F:
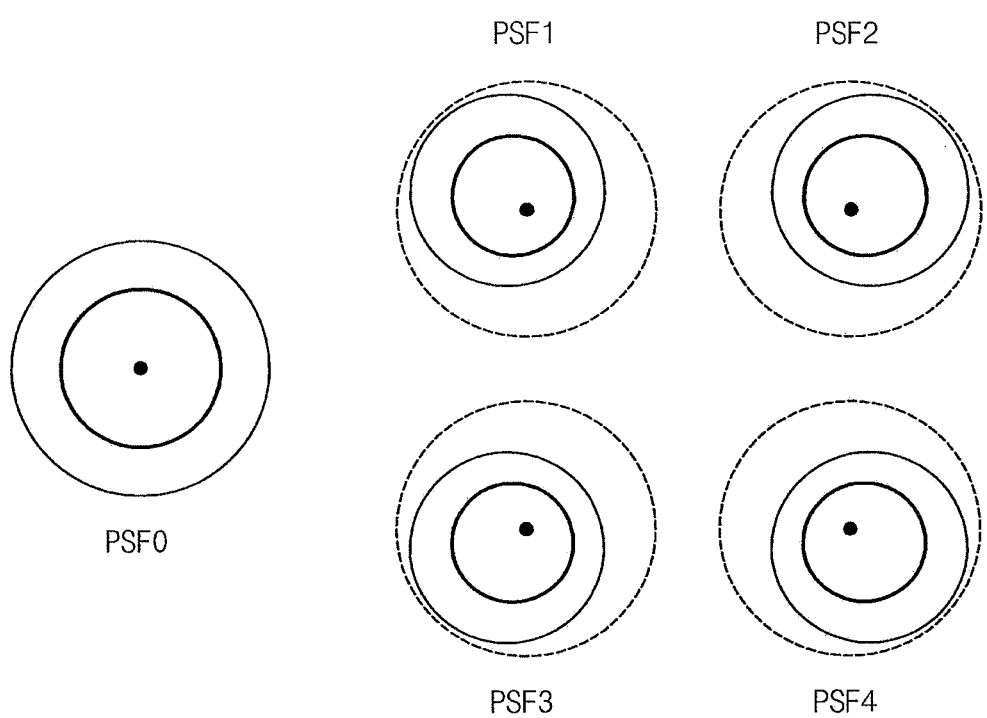

FIG. 3F is a contour plot of the PSF when four subpixels are formed under one microlens. "PSF0" represents the PSF detected when one subpixel is centered under one microlens. A point at the center of the PSF represents a position of the optical axis, and the PSF is centered around the optical axis when the image sensor is in focus. "PSF1", "PSF2," "PSF3" and "PSF4" represent shapes of the PSFs detected by each subpixel, and the dotted lines in "PSF1" through "PSF4" represent "PSF0." When the image sensor is in focus, the PSF of each subpixel is at the optical axis. However, when the image sensor is out of focus, the center of the PSF of each subpixel is shifted away from the optical axis, and the degree of shifting of each PSF is proportional to the degree of defocus of the optical system. As in a case of the dual pixel image sensor, a relationship of PSF0=PSF1+PSF2+PSF3+PSF4 is established in a general case. In particular, PSF1=PSF2=PFS3=PSF4=¼ *PSF may be realized when the image sensor is correctly in focus and when there is no shift between the microlens and the subpixels. However, in practice, the subpixels and the sub-PSFs are slightly different in size due to fabrication tolerances, resulting in a relationship of α *PSF1=β*PSF2=γ *PSF3=δ *PSF4=PSF0.

Figure 3G:
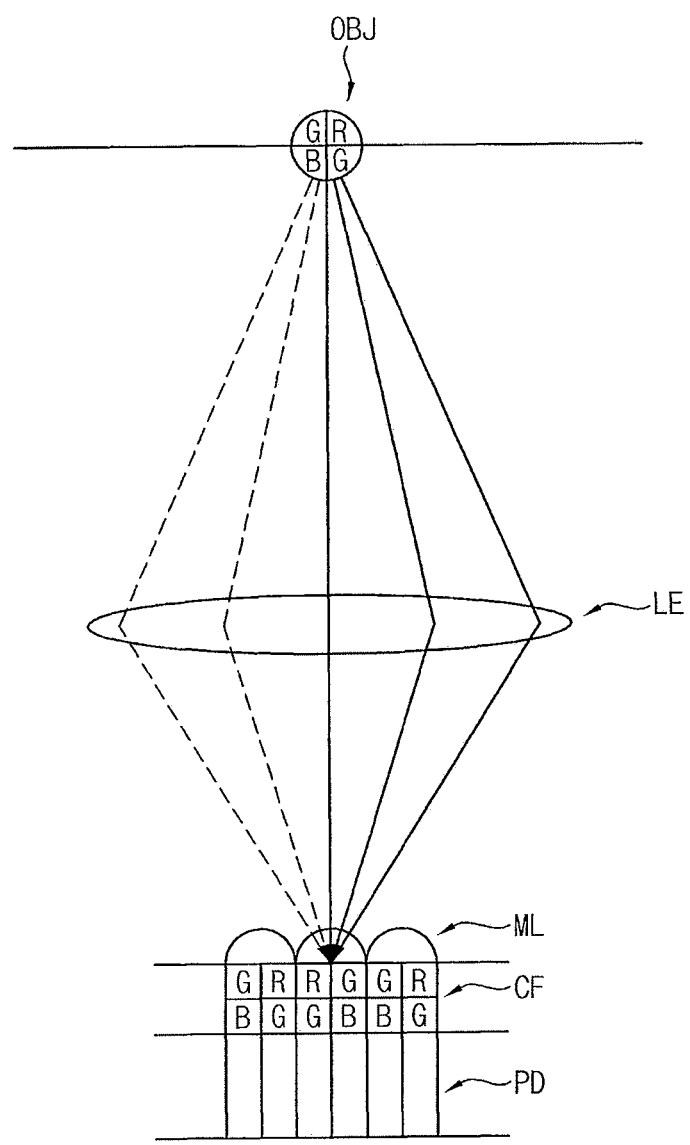
Figure 3H:
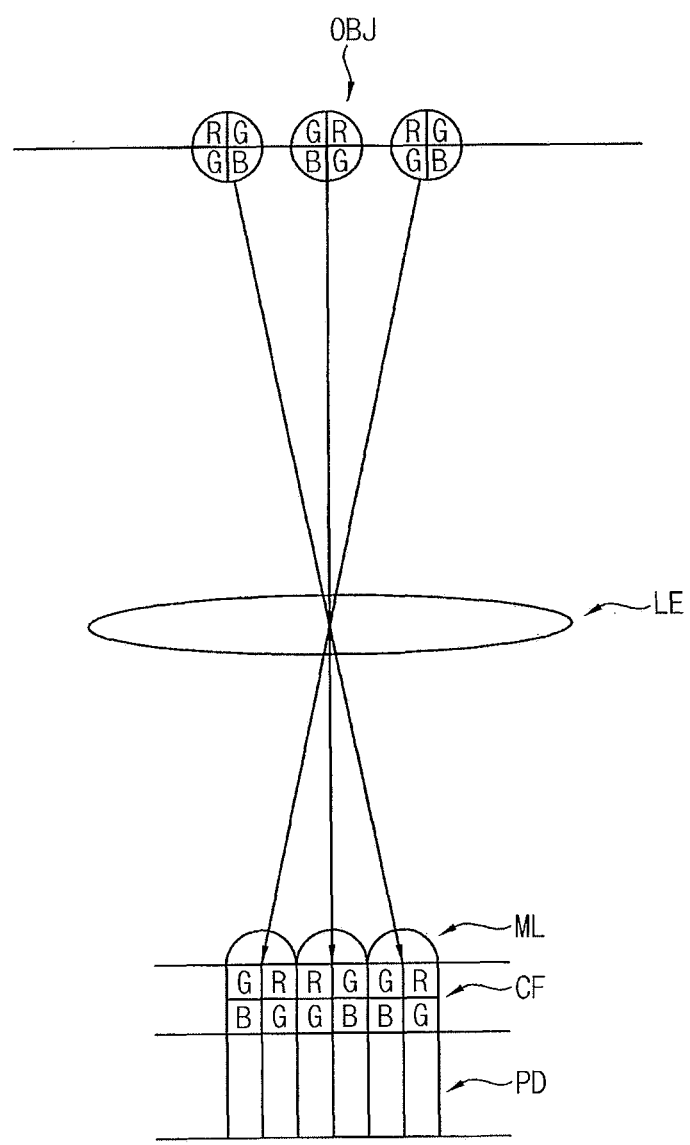

FIGS. 3G and 3H are diagrams for describing an example where the pixel array of FIG. 2 is in focus. Referring to FIGS. 3G and 3H, "OBJ" represents an object, "LE" represents a lens of an image pickup device (e.g., a camera) that includes an image sensor, "ML" represents a microlens, "CF" represents a color filter, and "PD" represents a photoelectric conversion element (e.g., a photodiode). Although one photoelectric conversion element is shown under two color filters in FIGS. 3G and 3H for convenience of illustration, one photoelectric conversion element may be under one color filter.

FIGS. 3G and 3H show when the object OBJ is in focus and the subpixels sharing the microlens ML detect an image at the same point on the object OBJ plane. Subpixels for detecting different colors R, G and B are arranged under one microlens ML, and, thus, signals of different colors may be substantially simultaneously or concurrently obtained at one point on the object. In addition, in the pixel array included in the image sensor according to example embodiments, subpixels for detecting the same color may not be all located in the same direction with respect to the center of the microlens ML, and subpixels for detecting the same color in neighboring pixel groups may be located in different directions.

In FIG. 3G, the PSFs of the subpixels included in the pixel group focused on the object OBJ may correspond to the same position at the object OBJ, and thus R, G and B signals of the position at the object OBJ may be substantially simultaneously or concurrently obtained from the corresponding pixel group. For example, assuming that a signal of the R subpixel included in the pixel group is R1, and a signal obtained by an image sensor having one R pixel under one microlens is R0, a relationship of α *R1=R0 is established. Similarly, assuming that signals of two G subpixels included in the pixel group are G1 and G2, and a signal obtained by an image sensor having one G pixel that is not divided is G0, a relationship of k*(G1+G2)=G0 is established. In other words, when the image sensor is in focus, R, G and B values corresponding to the position at the object OBJ may be obtained by multiplying signals obtained from R, G and B subpixels by appropriate gains, respectively.

FIG. 3H shows positions where each pixel group detects a signal on the object plane in a focused state, and each pixel group detects R, G and B signals at different points on the object plane.

Figure 4:
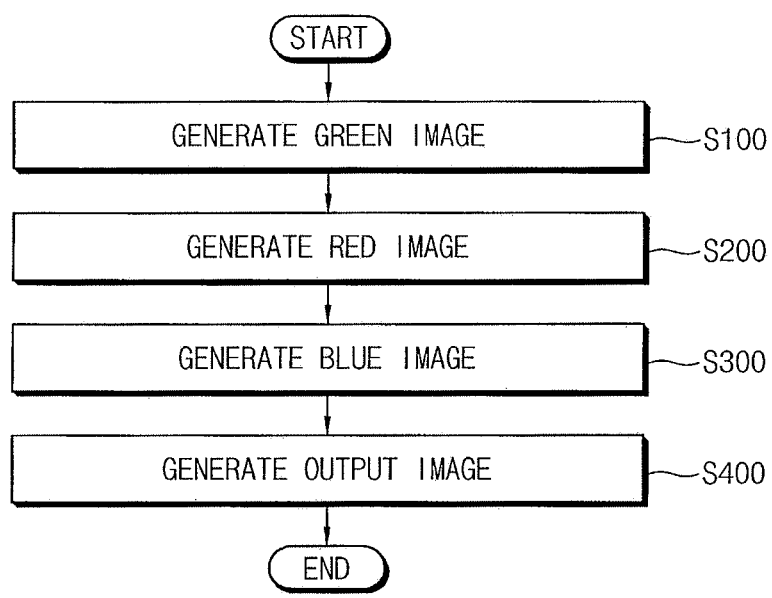
FIG. 4 illustrates a flowchart of a method of processing an image based on a pixel array according to example embodiments.

In the image sensor of FIG. 2, additional signal processing may be required when the optical system is out of focus, which will be described with reference to FIG. 4. FIG. 4 is a flowchart illustrating a method of processing an image based on a pixel array according to example embodiments.

Referring to FIG. 4, in a method of processing an image based on the pixel array according to example embodiments, a green image is generated using green pixels (operation S100). As described with reference to FIG. 2, since the number of green pixels included in the pixel array 100a is larger than the number of red pixels or the number of blue pixels included in the pixel array 100a and since a green component or a green signal is dominant during image processing, the green image may be generated before other images.

A red image is generated using the green image and red pixels (operation S200), and a blue image is generated using the green image and blue pixels (operation S300). The green image may be used as a reference image for generating the red image and the blue image. Although FIG. 4 illustrates that the red image is generated before the blue image, the example embodiments are not limited thereto. For example, the blue image may be generated before the red image, or the red image and the blue image may be substantially simultaneously or concurrently generated.

After all the green, red and blue images are obtained, an output image is generated using (e.g., by synthesizing, compositing, or combining) the green image, the red image and the blue image (operation S400). The output image may correspond to one frame image obtained from the pixel array of the image sensor, and the output image may be obtained without reducing the resolution according to example embodiments.

Figure 5:
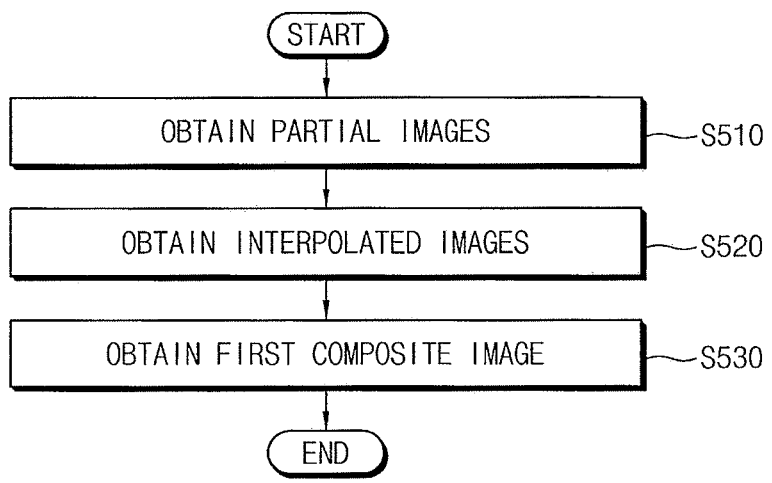
FIG. 5 illustrates a flowchart of an example of generating a green image, a red image or a blue image in FIG. 4.

FIG. 5 is a flowchart illustrating an example of generating a green image, a red image, or a blue image in FIG. 4. Referring to FIGS. 4 and 5, when generating the green image (operation S100), when generating the red image (operation S200), or when generating the blue image (operation S300), a plurality of partial images may be obtained using a plurality of subpixels (operation S510), and a plurality of interpolated images may be obtained by performing an interpolation (or a demosaic) operation on the plurality of partial images (operation S520). Green partial images and green interpolated images for the green image may be different from red/blue partial images and red/blue interpolated images for the red/blue image, which will be described with reference to FIGS. 6A to 6E.

A first composite image may be obtained by summing the plurality of interpolated images (operation S530). For example, the plurality of interpolated images may be synthesized or merged under the same conditions without any weights to generate the first composite image. The first composite image may be output as the green image, the red image, or the blue image.

FIGS. 6A, 6B, 6C, 6D and 6E are diagrams for describing the method of processing the image of FIGS. 4 and 5. FIGS. 6A, 6B, 6C, 6D and 6E show an example of generating the green image using the green pixels.

Figure 6A:
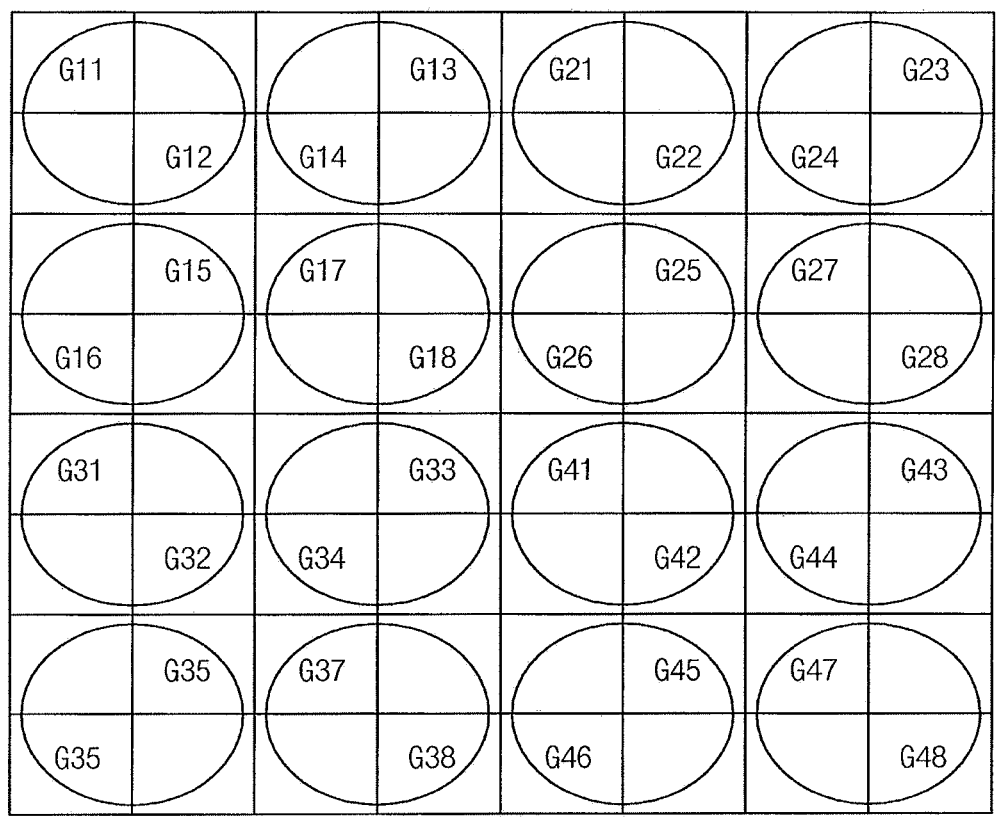
Figure 6B:
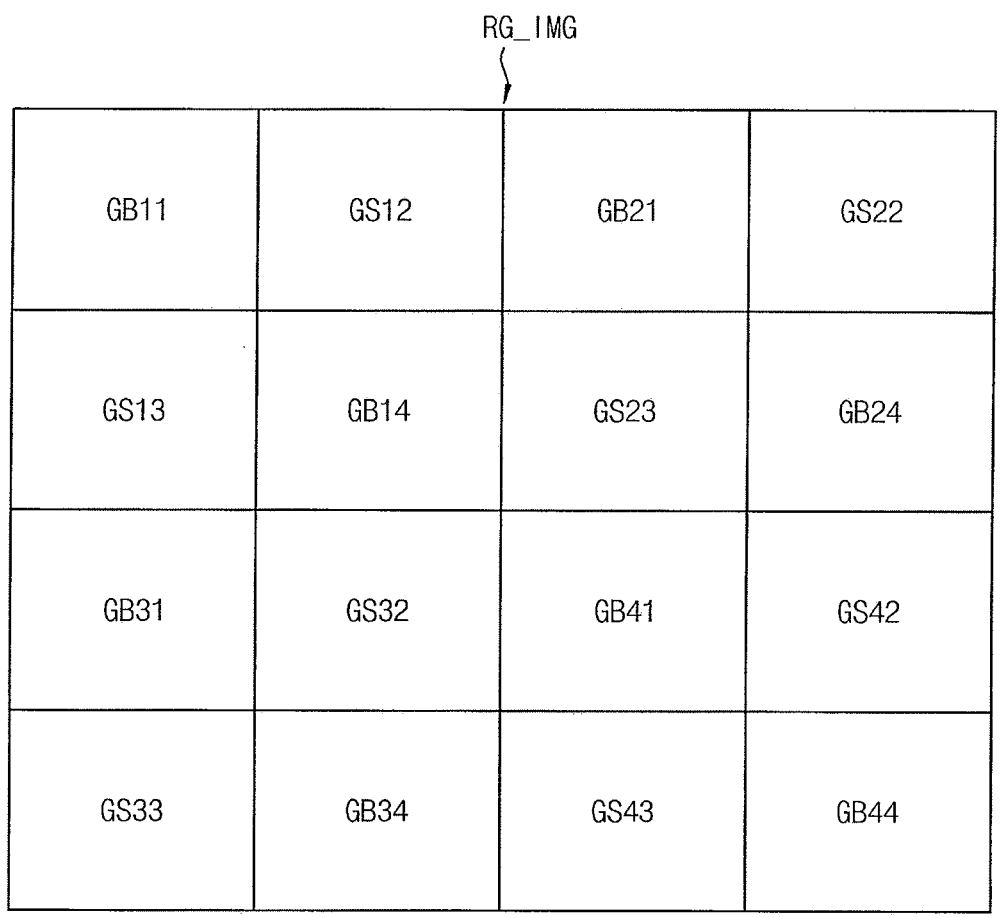

Referring to FIGS. 6A and 6B, a raw green image RG_IMG may be obtained using the green pixels G11~G18, G21~G28, G31~G38 and G41~G48 included in the pixel array 100a. For example, a first green signal GB11 (which is a single signal) included in the green image RG_IMG may be generated by averaging signals from the first and second green pixels G11 and G12 arranged in the first diagonal direction within the first pixel group PG11 (e.g., by adding the signals from the first and second green pixels G11 and G12 and by dividing the added signal by two). A second green signal GS12 included in the raw green image RG_IMG may be generated by averaging signals from the third and fourth green pixels G13 and G14 arranged in the second diagonal direction within the second pixel group PG12. A third green signal GS13 included in the raw green image RG_IMG may be generated by averaging signals from the fifth and sixth green pixels G15 and G16 arranged in the second diagonal direction within the third pixel group PG13. A fourth green signal GB14 included in the raw green image RG_IMG may be generated by averaging signals from the seventh and eighth green pixels G17 and G18 arranged in the first diagonal direction within the fourth pixel group PG14. Similarly, each of green signals GB21, GS22, GS23, GB24, GB31, GS32, GS33, GB34, GB41, GS42, GS43 and GB44 for the pixel groups PG15~PG1G may be generated using two of the green pixels G21~G28, G31~G38 and G41~G48 in the same pixel group.

In FIG. 6B, a green signal labeled "GB" represents a signal generated using green pixels arranged in a first arrangement (e.g., arranged in the first diagonal direction), such as the green pixels G11 and G12. A green signal labeled "GS" represents a signal generated using green pixels arranged in a second arrangement (e.g., arranged in the second diagonal direction) different from the first arrangement, such as the green pixels G13 and G14.

Referring to FIGS. 6B and 6C, a first partial green image PG_IMG1 and a second partial green image PG_IMG2 may be obtained by separating the raw green image RG_IMG. For example, the green signals GB11, GB14, GB21, GB24, GB31, GB34, GB41 and GB44 generated using the green pixels arranged in the first arrangement and the green signals GS12, GS13, GS22, GS23, GS32, GS33, GS42 and GS43 generated using the green pixels arranged in the second arrangement may be located at different positions in the green raw image RG_IMG, and the number of the green signals GB11, GB14, GB21, GB24, GB31, GB34, GB41 and GB44 and the number of the green signals GS12, GS13, GS22, GS23, GS32, GS33, GS42 and GS43 may be substantially equal to each other. Thus, the first partial green image PG_IMG1 including only the green signals GB11, GB14, GB21, GB24, GB31, GB34, GB41 and GB44 may be obtained, and the remaining positions other than the positions of the green signals GB11, GB14, GB21, GB24, GB31, GB34, GB41 and GB44 may be empty in the first partial green image PG_IMG1. Similarly, the second partial green image PG_IMG2 including only the green signals GS12, GS13, GS22, GS23, GS32, GS33, GS42 and GS43 may be obtained. In this example, the first partial green image PG_IMG1 may be a green image having characteristics of "PSF1"+"PSF4" in FIG. 3F, and the second partial green image PG_IMG2 may be a green image having characteristics of "PSF2"+"PSF3" in FIG. 3F.

Referring to FIGS. 6C and 6D, a first interpolated green image IG_IMG1 and a second interpolated green image IG_IMG2 may be generated by performing the interpolation on the first partial green image PG_IMG1 and the second partial green image PG_IMG2, respectively.

For example, interpolated green signals gb12, gb13, gb22, gb23, gb32, gb33, gb42 and gb43 included in the first interpolated green image IG_IMG1 may be generated by performing at least one of various interpolation algorithms based on the green signals GB11, GB14, GB21, GB24, GB31, GB34, GB41 and GB44. Similarly, interpolated green signals gs11, gs14, gs21, gs24, gs31, gs34, gs41 and gs44 may be generated by performing at least one of various interpolation algorithms based on the green signals GS12, GS13, GS22, GS23, GS32, GS33, GS42 and GS43.

In FIG. 6D, green signals labeled "GB" and "GS" in capital letters represent signals extracted from the green row image RG_IMG, and green signals labeled "gb" and "gs" in small letters represent signals generated by the interpolation operation.

In some example embodiments, only the first partial green image PG_IMG1 may be used to generate the first interpolated green image IG_IMG1. For example, the interpolated green signals gb12, gb13, gb22, gb23, gb32, gb33, gb42 and gb43 may be generated using only the green signals GB11, GB14, GB21, GB24, GB31, GB34, GB41 and GB44. Similarly, only the second partial green image PG_IMG2 may be used to generate the second interpolated green image IG_IMG2.

In other example embodiments, both the second partial green image PG_IMG2 and the first partial green image PG_IMG1 may be used to generate the first interpolated green image IG_IMG1. For example, the interpolated green signals gb12, gb13, gb22, gb23, gb32, gb33, gb42 and gb43 may be generated using the green signals GB11, GB14, GB21, GB24, GB31, GB34, GB41 and GB44 and the green signals GS12, GS13, GS22, GS23, GS32, GS33, GS42 and GS43. Similarly, both the first partial green image PG_IMG1 and the second partial green image PG_IMG2 may be used to generate the second interpolated green image IG_IMG2. Since two partial green images PG_IMG1 and PG_IMG2 include the same color information, they may be referred to the opposite image in a general interpolation scheme, and the two interpolated images IG_IMG1 and IG_IMG2 may be almost the same if the images are in focus.

The first interpolated green image IG_IMG1 may become an image in which the PSFs of all pixels in the image sensor have the characteristics of "PSF1"+"PSF4" in FIG. 3F, and the second interpolated green image IG_IMG2 may become an image in which the PSFs of all pixels in the image sensor have the characteristics of "PSF2"+"PSF3" in FIG. 3F.

Figure 6E:
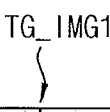

Referring to FIGS. 6D and 6E, a first green composite image TG_IMG1 may be generated by summing the first and second interpolated green images IG_IMG1 and IG_IMG2. For example, a green composite signal GT11 included in the first green composite image TG_IMG1 may be generated by averaging the green signals GB11 and gs11 at the same position in the first and second interpolated green images IG_IMG1 and IG_IMG2 (e.g., by averaging the green signals GB11 and gs11 without any weights). Similarly, each of green composite signals GT12, GT13, GT14, GT21, GT22, GT23, GT24, GT31, GT32, GT33, GT34, GT41, GT42, GT43 and GT44 may be generated by averaging the green signals at the same position.

The first green composite image TG_IMG1 may be output as the green image. The green image may have the characteristics of "PSF1"+"PSF2"+"PSF3"+"PSF4" in FIG. 3F. Thus, the green image may be substantially the same image as an image obtained from an image sensor in which all subpixels are green pixels. In addition, when the green image is obtained according to the above-described scheme with reference to FIGS. 6A through 6E, a normal green image may be efficiently obtained by an automatic calibration even if the image is out of focus.

Figure 7:
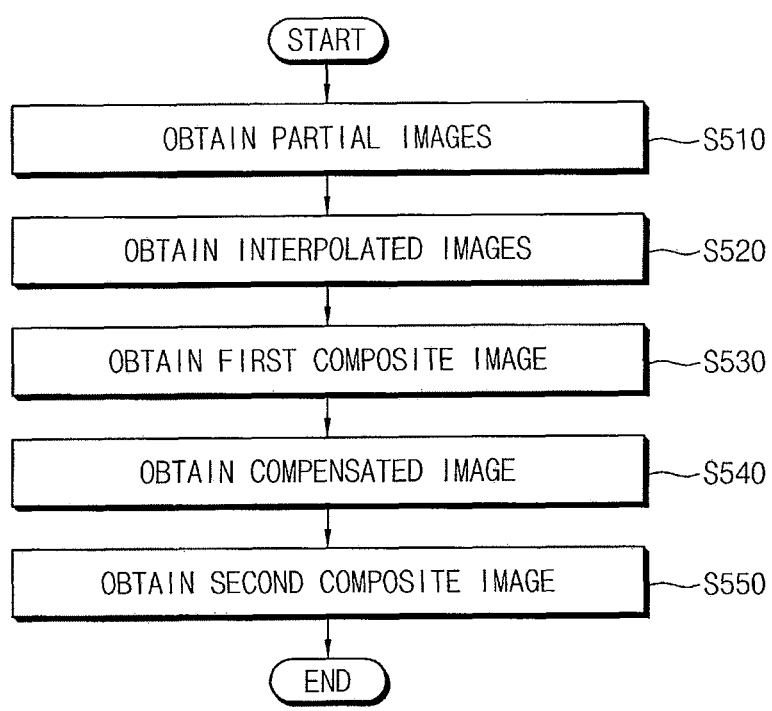
FIG. 7 illustrates a flowchart of another example of generating a green image, a red image or a blue image in FIG. 4.

FIG. 7 is a flowchart illustrating another example of generating a green image, a red image or a blue image in FIG. 4. The descriptions repeated with FIG. 5 will be omitted. Referring to FIGS. 4 and 7, operations S510, S520 and S530 in FIG. 7 may be substantially the same as operations S510, S520 and S530 in FIG. 5, respectively.

A compensated image including gain-compensated signals may be obtained by multiplying a plurality of signals from the plurality of subpixels by gain compensation values (operation S540). The gain compensation values may be different for subpixels and/or pixel groups, which will be described with reference to FIG. 9.

A second composite image may be generated based on the first composite image and the compensated image (operation S550). For example, a first weight may be assigned to the first composite image, a second weight may be assigned to the compensated image, and then the second composite image may be generated by summing the first composite image with the first weight and the compensated image with the second weight. The second composite image may be output as the green image, the red image, or the blue image.

Figure 8A:
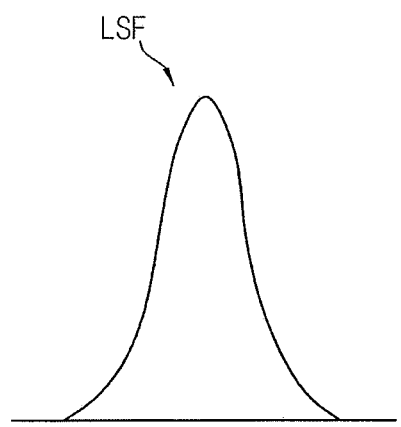
Figure 8B:
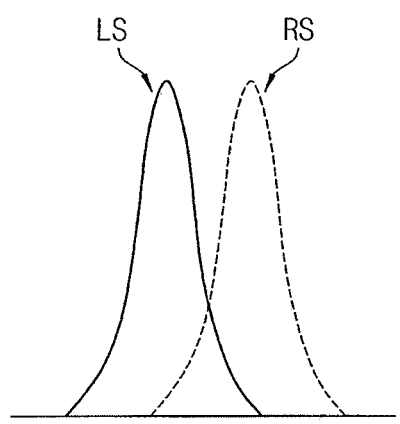
Figure 8C:
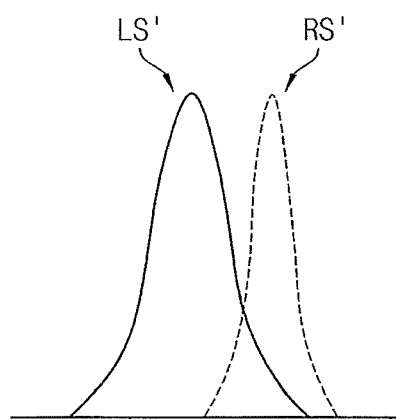
Figure 9B:
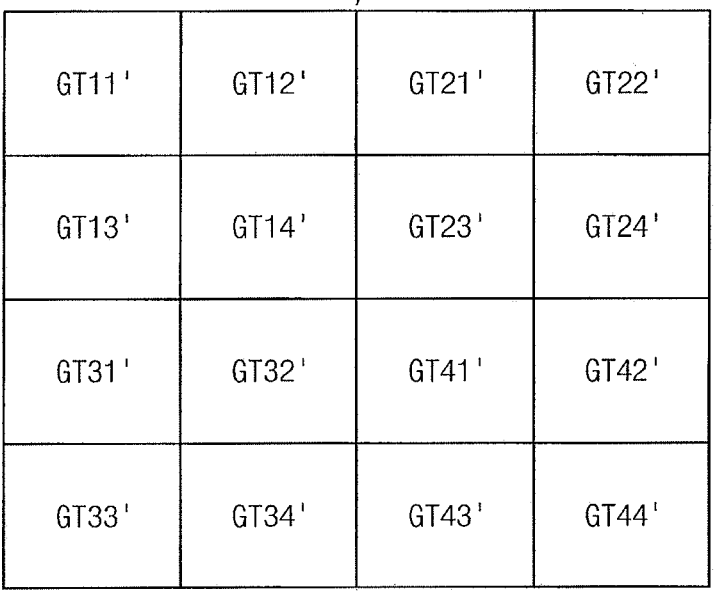

FIGS. 8A, 8B, 8C, 9A, and 9B are diagrams for describing the method of processing the image of FIGS. 4 and 7. FIGS. 8A, 8B and 8C show a concept of image processing using a line spread function (LSF). FIGS. 9A and 9B show another example of generating the green image using the green pixels.

FIG. 8A shows the LSF in a general defocus state, and the sum of signals from subpixels under the same microlens may have the general LSF characteristic as illustrated in FIG. 8A.

FIG. 8B shows the LSFs of a signal LS from the left subpixel and a signal RS from the right subpixel among subpixels under the same microlens. The left subpixel and the right subpixel may detect only a part of the entire LSF according to the defocus state, and the entire LSF of FIG. 8A may be obtained by summing the LSFs of the two subpixels.

As with FIG. 8B, FIG. 8C shows the LSFs of a signal LS' from the left subpixel and a signal RS' from the right subpixel among subpixels under the same microlens. In FIG. 8B, the LSFs of the left subpixel and the right subpixel may be symmetric because the center of the microlens coincides or matches with the positions of the subpixels (e.g., the vertices of the subpixels and/or the center of the pixel group) without error. However, since there is an error or shift between the center of the microlens and the positions of the subpixels (e.g., the position of the microlens is tilted or shifted) in FIG. 8C, the LSFs of the left subpixel and the right subpixel may be asymmetric, and the amount of light detected by one subpixel (e.g., the left subpixel in FIG. 8C) may be increased.

Although FIGS. 8B and 8C illustrate an example of two left and right subpixels for convenience of illustration, example embodiments may be similarly applied to an example where one microlens is shared by four subpixels as illustrated in FIG. 2.

To correct the error caused by the shift of the microlens described above, the compensated image may be additionally used as described with reference to steps S540 and S550 in FIG. 7. Referring to FIGS. 6B and 9A, a compensated green image CG_IMG may be obtained by applying gain compensation values to the raw green image RG_IMG.

For example, a compensated green signal GB11' included in the compensated green image CG_IMG may be generated by multiplying the green signal GB11 by a gain compensation value $\alpha 11$. Similarly, each of compensated green signals GS12', GS13', GB14', GB21', GS22', GS23', GB24', GB31', GS32', GS33', GB34', GB41', GS42', GS43' and GB44' may be generated by multiplying a respective one of the green signals GS12, GS13, GB14, GB21, GS22, GS23, GB24, GB31, GS32, GS33, GB34, GB41, GS42, GS43 and GB44 by a respective one of gain compensation values $\beta 12$, $\beta 13$, $\alpha 14$, $\alpha 21$, $\beta 22$, $\beta 23$, $\alpha 24$, $\alpha 31$, $\beta 2$, $\beta 33$, $\alpha 34$, $\alpha 41$, $\beta 42$, $\beta 43$ and $\alpha 44$.

In some example embodiments, the degree of shift of each microlens may be determined, e.g., through a test in the manufacturing process of the pixel array, and then the gain compensation values $\alpha 11$, $\beta 12$, $\beta 13$, $\alpha 14$, $\alpha 21$, $\beta 22$, $\beta 23$, $\alpha 24$, $\alpha 31$, $\beta 32$, $\beta 33$, $\alpha 34$, $\alpha 41$, $\beta 42$, $\beta 43$, $\alpha 44$ may be preset and stored.

As labeled by different characters "a" and "P" in FIG. 9A, the gain compensation values may be set differently for the "GB" signals and the "GS" signals. In addition, although FIG. 9A illustrates that the gain compensation values are set differently for each pixel group, the gain compensation values may be set differently for each subpixel.

Referring to FIGS. 6E, 9A and 9B, a second green composite image TG_IMG2 may be generated by summing the first green composite image TG_IMG1 with a first weight and the compensated green image CG_IMG with a second weight.

For example, a first weight "A" and a second weight "(1-A)" may be assigned to the green composite signal GT11 and the compensated green signal GB11' at the same position in the first green composite image TG_IMG1 and the compensated green image CG_IMG, respectively, and then a green composite signal GT11' included in the second green composite image TG_IMG2 may be generated by summing the green composite signal GT11 with the first weight "A" and the compensated green signal GB11' with the second weight "(1-A)" (e.g., GT11'=A*GT11+(1-A)*GB11'). Similarly, each of green composite signals GT12', GT13', GT14', GT21', GT22', GT23', GT24', GT31', GT32', GT33', GT34', GT41', GT42', GT43' and GT44' may be generated by summing a respective one of the green composite signals GT12, GT13, GT14, GT21, GT22, GT23, GT24, GT31, GT32, GT33, GT34, GT41, GT42, GT43 and GT44 with the first weight "A" and a respective one of the compensated green signals GS12', GS13', GB14', GB21', GS22', GS23', GB24', GB31', GS32', GS33', GB34', GB41', GS42', GS43' and GB44'. The first weight "A" and the second weight "(1-A)" may be applied equally or differently for all signals.

In some example embodiments, the first weight "A" and the second weight "(1-A)" may be determined based on at least one of various parameters and/or factors such as a result of analyzing the first green composite image TG_IMG1, a result of analyzing the compensated green image CG_IMG, a result of auto focusing, a frequency range of an image, etc.

The compensated green image CG_IMG of FIG. 9A may be substantially the same as an image from an image sensor in which all pixels in the focused area of the image are green pixels. The first green composite image TG_IMG1 of FIG. 6E may be a precise green image even in the unfocused area, but an error due to the limitation of the interpolation algorithm may occur on a high frequency image in focus. Thus, the value "A" associated with the first and second weights may be set to be close to zero in the focused area of the image and close to one in the unfocused area of the image.

The second green composite image TG_IMG2 may be output as the green image. When the green image is obtained according to the above-described scheme with reference to FIGS. 6A through 6E, 9A and 9B, a normal green image may be efficiently obtained by an automatic calibration even if the image is out of focus and there is an error due to the shift relative to the microlens.

FIGS. 10A, 10B, 10C, 10D and 10E are diagrams for describing the method of processing the image of FIGS. 4 and 5. FIGS. 10A, 10B, 10C, 10D and 10E show an example of generating the red image using the red pixels. As described above, a process of generating the green image and a process of generating the red image are partially different, and the differences will be mainly described.

Figure 10A:
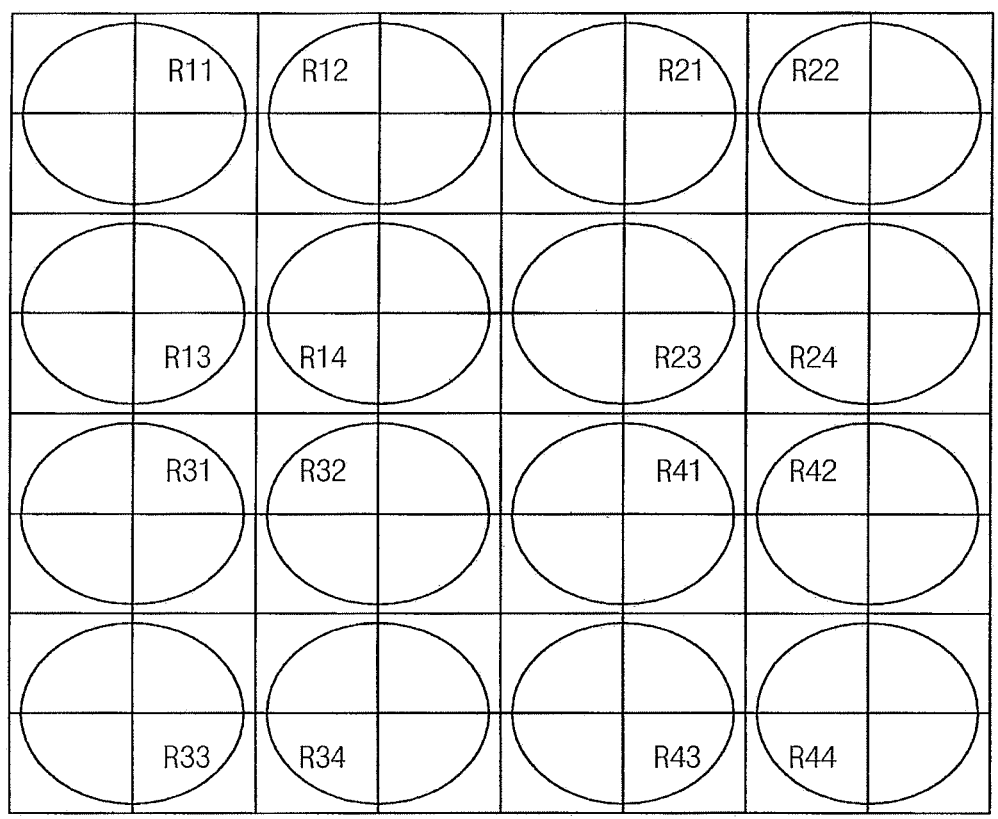
Figure 10B:

Referring to FIGS. 10A and 10B, a raw red image RR_IMG may be obtained using the red pixels R11~R14, R21~R24, R31~R34 and R41~R44 included in the pixel array 100a.

For example, a first red signal R11Q1 included in the raw red image RR_IMG may be obtained from the first red pixel R11 in a first quadrant within the first pixel group PG11. A second red signal R12Q2 included in the raw red image RR_IMG may be obtained from the second red pixel R12 in a second quadrant within the second pixel group PG12. A third red signal R13Q4 included in the raw red image RR_IMG may be obtained from the third red pixel R13 in a fourth quadrant within the third pixel group PG13. A fourth red signal R14Q3 included in the raw red image RR_IMG may be obtained from the fourth red pixel R14 in a third quadrant within the fourth pixel group PG14. Similarly, each of red signals R21Q1, R22Q2, R23Q4, R24Q3, R31Q1. R32Q2, R33Q4, R34Q3, R41Q1, R42Q2, R43Q4 and R44Q3 for the pixel groups PG15~PG1G may be obtained from a respective one of the red pixels R21-R24, R31-R34 and R41-R44.

In FIG. 10B, each of "1Q," "2Q," "3Q and "4Q" at the end of each red signal represent that each red pixel is in a respective one of the first, second, third and fourth quadrants within each pixel group. Referring to FIGS. 10B and 10C, a first partial red image PR_IMG1, a second partial red 1 image PR_IMG2, a third partial red image PR_IMG3 and a fourth partial red image PR_IMG4 may be obtained by separating the raw red image RR_IMG.

For example, the first partial red image PR_IMG1 includes only the red signals R11Q1, R21Q1, R31Q1 and R41Q1 from the red pixels R11, R21, R31 and R41 arranged in a first quadrant, and the remaining positions other than the positions of the red signals R11Q1, R21Q1, R31Q1 and R41Q1 may be empty in the first partial red image PR_IMG1. Similarly, the second partial red image PR_IMG2 includes only the red signals R12Q2, R22Q2, R32Q2 and R42Q2 from the red pixels R12, R22, R32 and R42 arranged in a second quadrant. The third partial red image PR_IMG3 includes only the red signals R13Q4, R23Q4, R33Q4 and R43Q4 from the red pixels R13, R23, R33 and R43 arranged in a fourth quadrant. The fourth partial red image PR_IMG4 including only the red signals R14Q3, R24Q3, R34Q3 and R44Q3 from the red pixels R14, R24, R34 and R44 arranged in a third quadrant.

Referring to FIGS. 10C and 10D, a first interpolated red image IR_IMG1, a second interpolated red image IR_IMG2, a third interpolated red image IR_IMG3 and a fourth interpolated red image IR_IMG4 may be generated by performing the interpolation on the first partial red image PR_IMG1, the second partial red image PR_IMG2, the third partial red image PR_IMG3 and the fourth partial red image PR_IMG4, respectively, based on the green image, e.g., intensities of the raw green image in the same pixel.

For example, interpolated red signals r12$q$1, r13$q$1, r14$q$1, r22$q$1, r23$q$1, r24$q$1, r32$q$1, r33$q$1, r34$q$1, r42$q$1, r43$q$1 and r44$q$1 included in the first interpolated red image IR_IMG1 may be generated by performing at least one of various interpolation algorithms based on the green image and the red signals R11Q1, R21Q1, R31Q1 and R41Q1. Since there are many empty portions in the first partial red image PR_IMG1, the green image may be referred to for the interpolation operation. Similarly, interpolated red signals r11$q$2, r13$q$2, r14$q$2, r21$q$2, r23$q$2, r24$q$2, r31$q$2, r33$q$2, r34$q$2, r41$q$2, r43$q$2, and r44$q$2 may be generated by performing at least one of various interpolation algorithms based on the green image and the red signals R12Q2, R22Q2, R32Q2 and R42Q2. Interpolated red signals r11$q$4, r12$q$4, r14$q$4, r21$q$4, r22$q$4, r24$q$4, r31$q$4, r32$q$4, r34$q$4, r41$q$4, r42$q$4 and r44$q$4 may be generated by performing at least one of various interpolation algorithms based on the green image and the red signals R13Q4, R23Q4, R33Q4 and R43Q4. Interpolated red signals r11$q$3, r12$q$3, r13$q$3, r21$q$3, r22$q$3, r23$q$3, r31$q$3, r32$q$3, r33$q$3, r41$q$3, r42$q$3 and r43$q$3 may be generated by performing at least one of various interpolation algorithms based on the green image and the red signals R14Q3, R24Q3, R34Q3 and R44Q3.

In some example embodiments, only the green image and the first partial red image PR_IMG1 may be used to generate the first interpolated red image IR_IMG1. In other example embodiments, at least one of the second, third and fourth partial red images PR_IMG2, PR_IMG3 and PR_IMG4 may be additionally interpolated to generate the first interpolated red image IR_IMG1.

Referring to FIGS. 10D and 10E, a first red composite image TR_IMG1 may be generated by averaging the first, second, third and fourth interpolated red images IR_IMG1, IR_IMG2, IR_IMG3 and IR_IMG4. The first red composite image TR_IMG1 may be output as the red image.

For example, a red composite signal RT11 included in the first red composite image TR_IMG1 may be generated by adding the red signals R11Q1, r11$q$2, r11$q$4 and r11$q$3 at the same position in the first, second, third, and fourth interpolated red images IR_IMG1, IR_IMG2, IR_IMG3, and IR_IMG4 and by dividing the added signal by four (e.g., by summing the red signals R11Q1, r11$q$2, r11$q$4 and r11$q$3 without any weights). Similarly, each of red composite signals RT12, RT13, RT14, RT21, RT22, RT23, RT24, RT31, RT32, RT33, RT34, RT41, RT42, RT43 and RT44 may be generated by averaging the red signals at the same position.

Alternatively, a compensated red image may be obtained by generating a second red composite image based on the first red composite image TR_IMG1 and the compensated red image, and the second red composite image may be output as the red image, as described with reference to FIGS. 7 to 9B. In addition, the blue image may be generated in the same manner as the red image.

An image for focus detection may be generated by an image sensor including the pixel array of FIG. 2. For example, the L signal may be generated by summing signals from pixels on the left side with respect to the center of the microlens in a plurality of neighboring pixel groups in FIG. 2 according to a specific rule, and the R signal may be generated by summing signals from pixels on the right side with respect to the center of the microlens according to the specific rule. The degree of focus of the image may be detected by measuring the phase difference between the generated L and R signals. When generating the L and R signals, the rule for summing the signals from the pixels may include simple addition, a method of assigning different weights according to colors of the pixels, and a method of assigning different weights according to positions of the pixels. For example, in four neighboring pixel groups PG11, PG12, PG13 and PG14, the L signal may be generated by summing signals from the left side pixels G11, B11, R12, G14, B13, G16, G17 and R14, and the R signal may be generated by summing signals from the right side pixels R11, G12, G13, B12, G15, R13, B14 and G18. In a similar way, a top signal may be generated by summing signals from pixels above the center of the microlens, a bottom signal may be generated by summing signals from pixels below the center of the microlens, and the degree of focus of the image may be detected by measuring the phase difference between the generated top and bottom signals.

In the image sensor including the pixel array of FIG. 2, an image may be output by averaging signals from four adjacent pixels having the same color for low power and high frame rate. For example, one green signal may be output by averaging the green signals G12, G14, G15 and G17. In a similar way, one blue signal may be output by averaging the blue signals B12, B21, B14 and B23, and one red signal may be output by averaging the red signals R13, R14, R32 and R32. By reading signals of the entire area of the image sensor in the similar way, a Bayer format image with a resolution of about ¼ may be obtained. An operation of summing signals from pixels may be performed using an analog circuit or a digital circuit.

Figure 11:
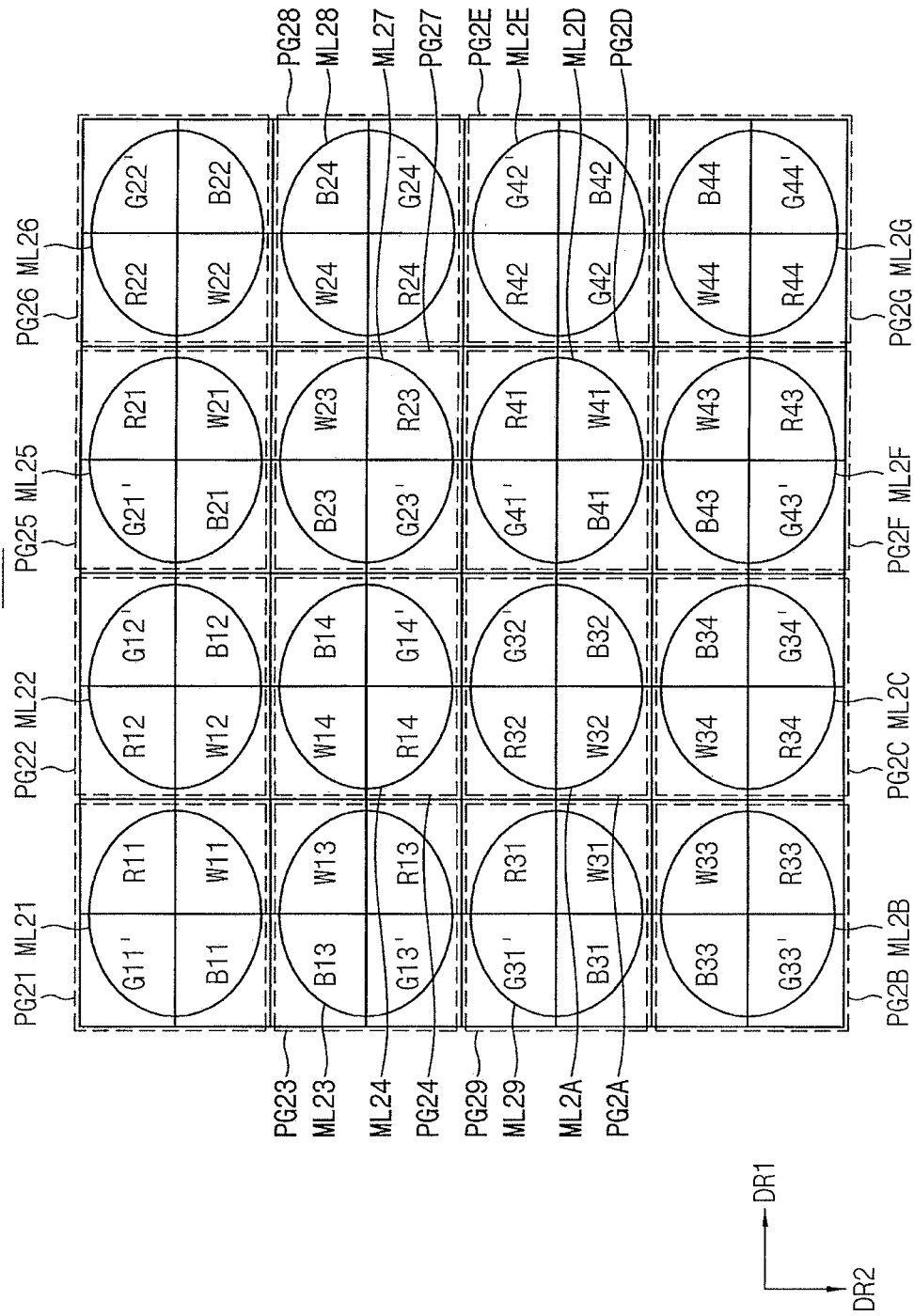
FIG. 11 illustrates a plan view of another example of the pixel array of FIG. 1.

FIG. 11 is a plan view of another example of the pixel array of FIG. 1. The descriptions repeated with FIG. 2 will be omitted. Referring to FIG. 11, a pixel array 100b included in an image sensor includes a plurality of pixel groups PG21, PG22, PG23, PG24, PG25, PG26, PG27, PG28, PG29, PG2A, PG2B, PG2C, PG2D, PG2E, PG2F and PG2G.

The plurality of pixel groups PG21-PG2G may include a plurality of green pixels G11', G12', G13', G14', G21', G22', G23', G24', G31', G32', G33', G34', G41', G42', G43' and G44', a plurality of red pixels R11~R14, R21~R24, R31~R34 and R41~R44, a plurality of blue pixels B11~B14, B21~B24, B31~B34 and B41~B44, a plurality of white pixels W11, W12, W13, W14, W21, W22, W23, W24, W31, W32, W33, W34, W41, W42, W43 and W44, and a plurality of microlenses ML21, ML22, ML23, ML24, ML25, ML26, ML27, ML28, ML29, ML2A, ML2B, ML2C, ML2D, ML2E, ML2F and ML2G.

The pixel array 100b of FIG. 11 may be substantially the same as the pixel array 100a of FIG. 2, except that some green pixels (e.g., G12, G14, G15 and G17 in FIG. 2) are replaced with white pixels (e.g., W11, W12, W13 and W14 in FIG. 11).

Figure 12:
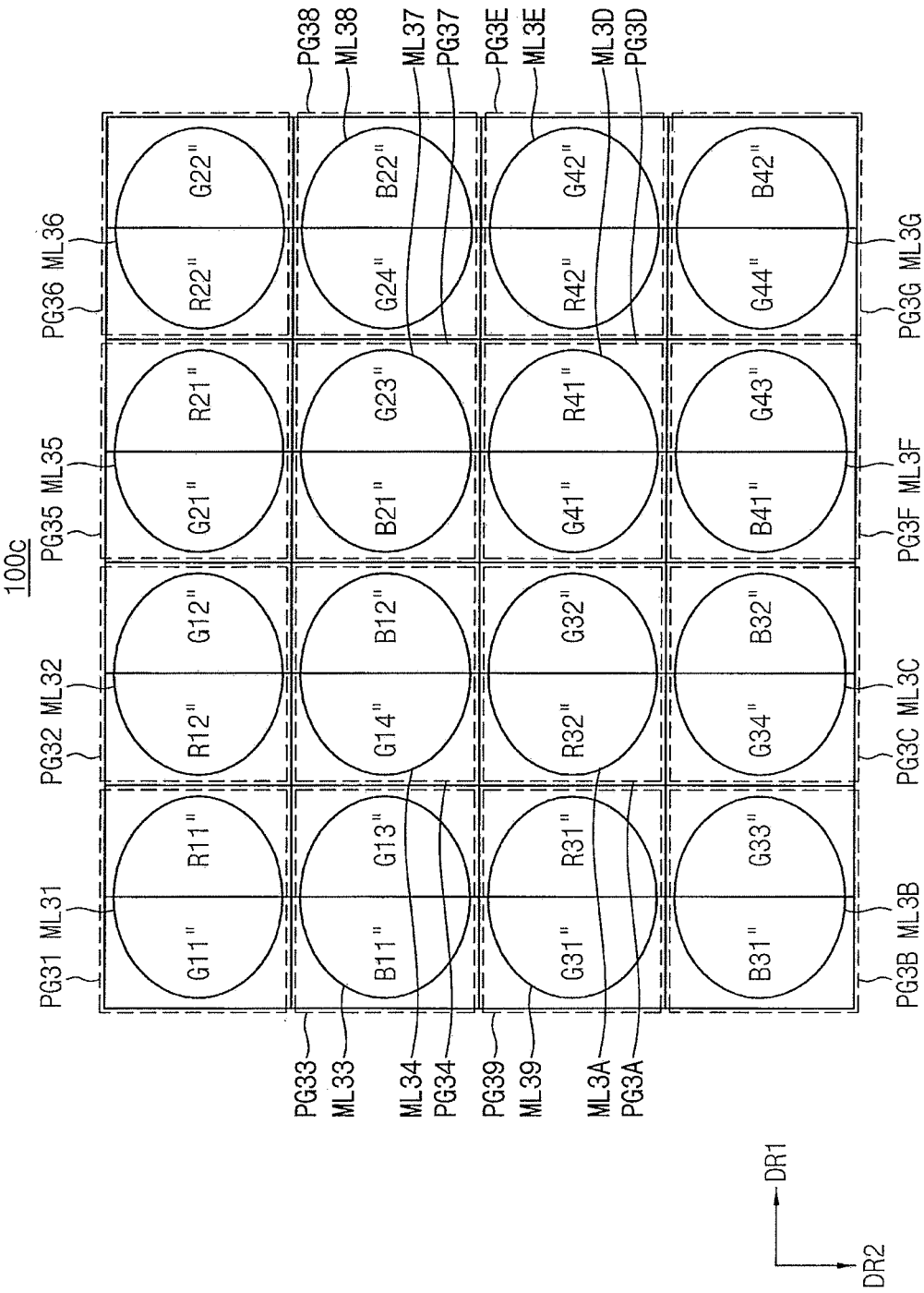
FIG. 12 illustrates a plan view of still another example of the pixel array of FIG. 1.

FIG. 12 is a plan view of still another example of the pixel array of FIG. 1. The descriptions repeated with FIG. 2 will be omitted. Referring to FIG. 12, a pixel array 100c included in an image sensor includes a plurality of pixel groups PG31, PG32, PG33, PG34, PG35, PG36, PG37, PG38, PG39, PG3A, PG3B, PG3C, PG3D, PG3E, PG3F and PG3G.

The pixel array 100c of FIG. 12 represents an example where one pixel group includes two subpixels (e.g., N=2). One pixel group includes one green pixel and one red pixel, or includes one green pixel and one blue pixel. A configuration of the pixel array 100c of FIG. 12 will be described in detail with respect to first through fourth pixel groups PG31-PG34 in a 2*2 matrix formation.

The first pixel group PG31 includes two subpixels (e.g., a first green pixel G11" and a first red pixel R11"), and a first microlens ML31 that is shared by the subpixels G11" and R11". The subpixels G11" and R11" may be arranged in a pattern of GR. The second pixel group PG32 includes two subpixels (e.g., a second red pixel R12" and a second green pixel G12"), and a second microlens ML32 that is shared by the subpixels R12" and G12". The subpixels R12" and G12" may be arranged in a pattern of RG. The third pixel group PG33 includes two subpixels (e.g., a first blue pixel B11" and a third green pixel G13"), and a third microlens ML33 that is shared by the subpixels B11" and G13". The subpixels B11" and G13" may be arranged in a pattern of BG. The fourth pixel group PG34 includes two subpixels (e.g., a fourth green pixel G14" and a second blue pixel B12"), and a fourth microlens ML34 that is shared by the subpixels G14" and B12". The subpixels G14" and B12" may be arranged in a pattern of GB.

A center of each microlens (e.g., the first microlens ML31) may coincide or match with a center of each pixel group (e.g., the first pixel group PG31), and may coincide or match with a center of edges or sides of subpixels in each pixel group (e.g., the subpixels G11" and R11" in the first pixel group PG31).

A first location of the first green pixel G11" in the first pixel group PG31 may be different from a second location of the second green pixel G12" in the second pixel group PG32. A third location of the third green pixel G13" in the third pixel group PG33 may be substantially the same as the second location. A fourth location of the fourth green pixel G14" in the fourth pixel group PG34 may be substantially the same as the first location.

Positions of the red pixels R11" and R12" in the pixel groups PG31 and PG32 may be different from each other. Similarly, positions of the blue pixels B11" and B12" in the pixel groups PG33 and PG34 may be different from each other.

A configuration of subpixels G21", G22", G23", G24", R21", R22", B21" and B22" and microlenses ML35, ML36, ML37 and ML38 included in the pixel groups PG35-PG38, a configuration of subpixels G31", G32", G33", G34", R3"1, R32", B31" and B32" and microlenses ML39, ML3A, ML3B and ML3C included in the pixel groups PG39-PG3C, and a configuration of subpixels G41", G42", G43", G44", R41", R42", B41" and B42" and microlenses ML3D, ML3E, ML3F and ML3G included in the pixel groups PG3D-PG3G may be substantially the same as a configuration of the subpixels G11", G12", G13", G14", R11", R12", B11" and B12" and the microlenses ML31, ML32, ML33 and ML34 included in the pixel groups PG31-PG34, respectively.

In summary, the pixel array 100c may include a plurality of pixel groups each of which includes two subpixels formed under one microlens, and each subpixel may detect one of three colors of red, green and blue. Subpixels for detecting the same color may not be all located in the same direction with respect to the center of the microlens, and subpixels for detecting the same color under the adjacent microlenses may be located in different directions.

Figure 13A:
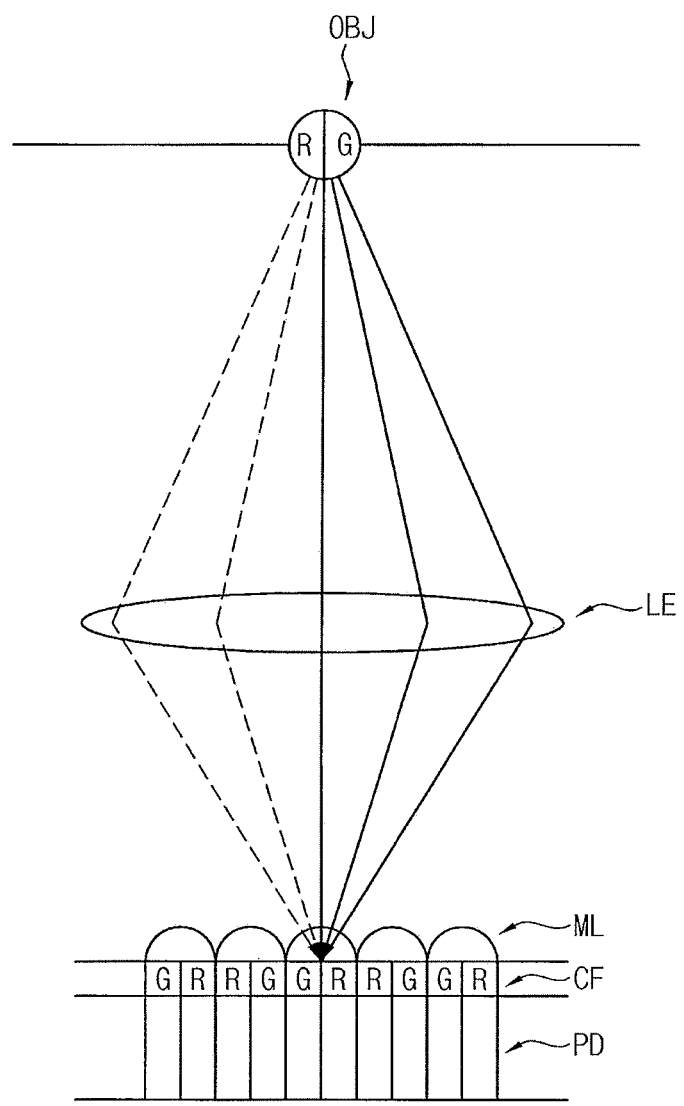
FIGS. 13A and 13B illustrate diagrams for describing an operation of the pixel array of FIG. 12.
Figure 13B:
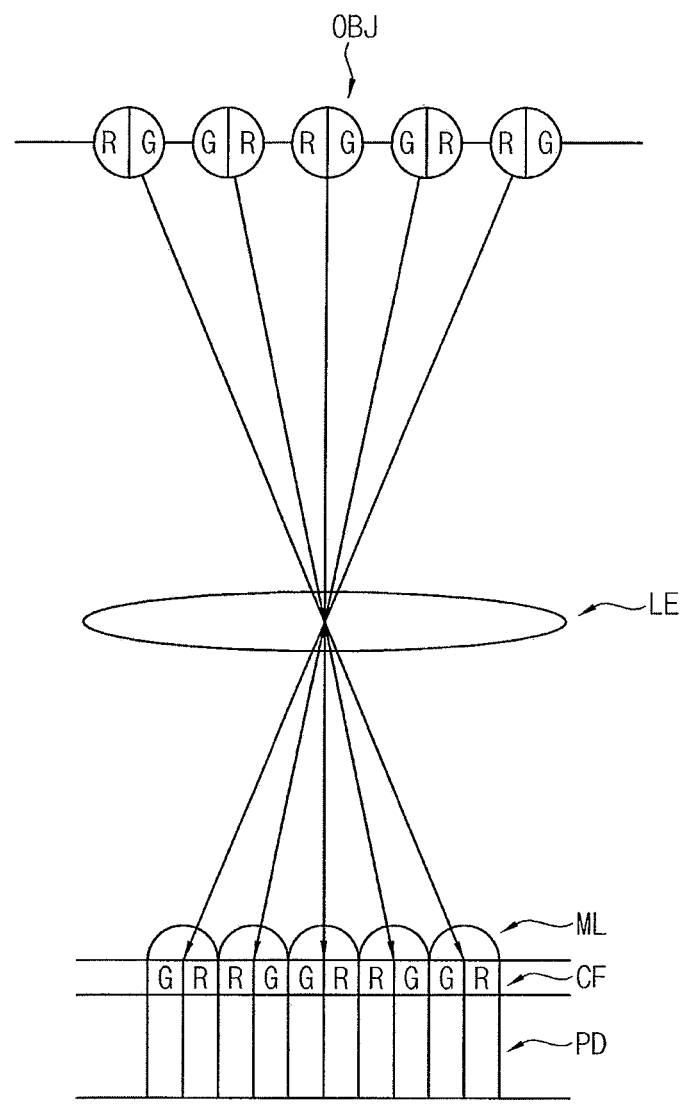

FIGS. 13A and 13B are diagrams for describing an operation of the pixel array of FIG. 12. FIGS. 13A and 13B show when the object OBJ is in focus, and the subpixels sharing the microlens ML detects an image at the same point on the object OBJ plane. Subpixels for detecting different colors R and G are formed and arranged under one microlens ML, and thus signals of different colors may be substantially simultaneously or concurrently obtained at one point on the object. In addition, in the pixel array included in the image sensor according to example embodiments, subpixels for detecting the same color in neighboring pixel groups may be located in different directions with respect to the center of the microlens ML.

Figure 14A:
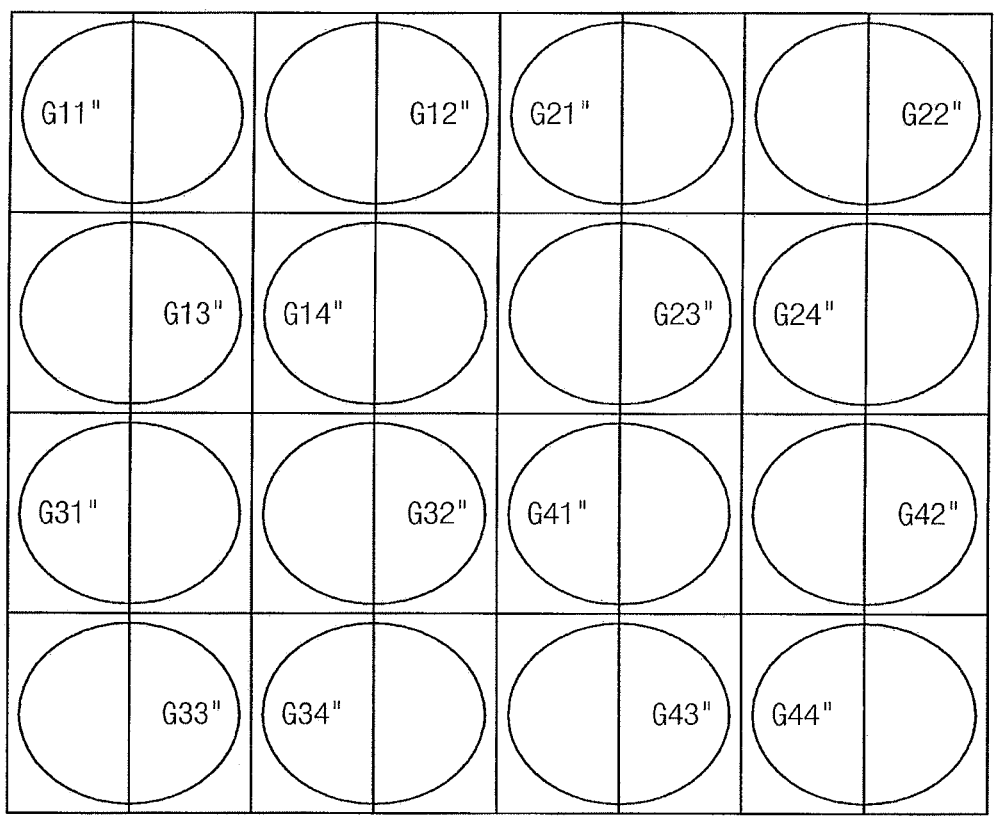
Figure 14B:

FIGS. 14A, 14B, 15A, 15B, 15C, 15D and 15E are diagrams for describing the method of processing the image of FIGS. 4 and 5 using the pixel array 100c of FIG. 12. FIGS. 14A and 14B show an example of generating the green image using the green pixels. FIGS. 15A, 15B, 15C, 15D and 15E show an example of generating the blue image using the blue pixels.

Referring to FIGS. 14A and 14B, a raw green image RG_IMG" may be obtained using the green pixels G11"~G14", G21"~G24", G31"~G34" and G41"~G44" included in the pixel array 100c.

For example, green signals GL11, GL14, GL21, GL24, GL31, GL34, GL41 and GL44 may be obtained from the green pixels G11", G14", G21", G24", G31", G34", G41" and G44", respectively, and green signals GR12, GR13, GR22, GR23, GR32, GR33, GR42 and GR43 may be obtained from the green pixels G12", G13", G22", G23", G32", G33", G42" and G43", respectively.

In FIG. 14B, a green signal labeled "GL" represents a signal generated using a green pixel arranged on the left side with respect to the center of each microlens. A green signal labeled "GR" represents a signal generated using a green pixel arranged on the right side with respect to the center of each microlens.

After then, generating partial green images, interpolated green images and a first composite green image, and generating a compensated green image and a second composite green image may be substantially the same as that described with reference to FIGS. 6C, 6D, 6E, 9A and 9B, so that the repeated descriptions will be omitted.

Figure 15A:
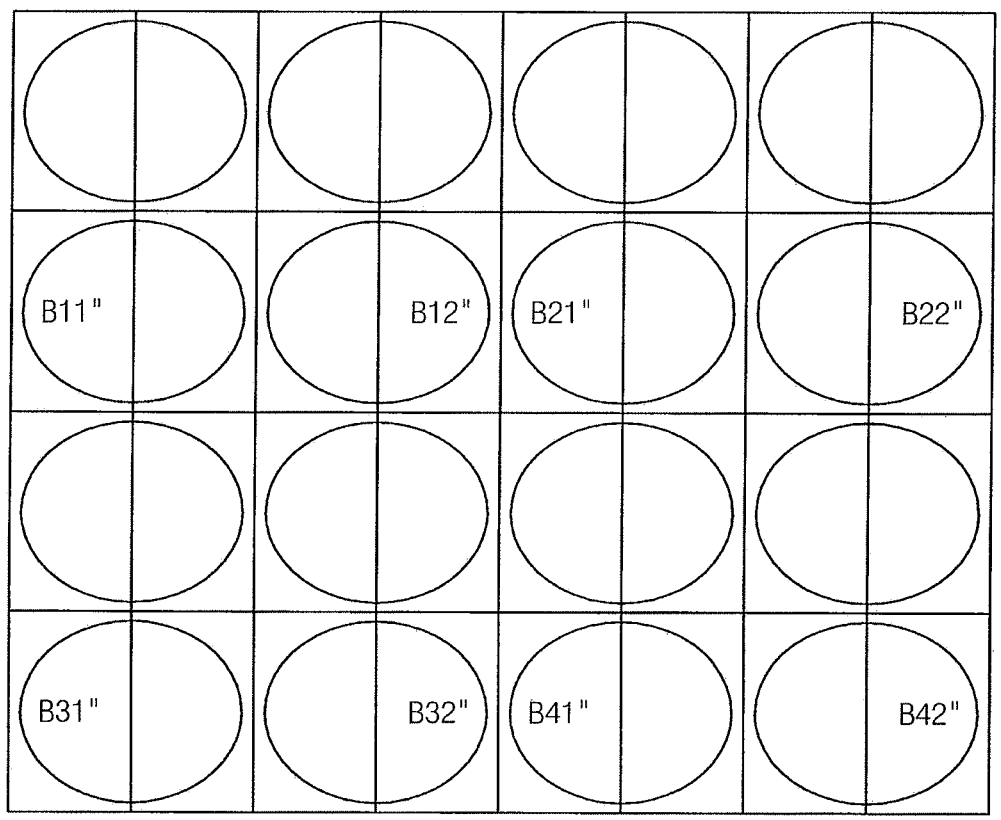
Figure 15B:
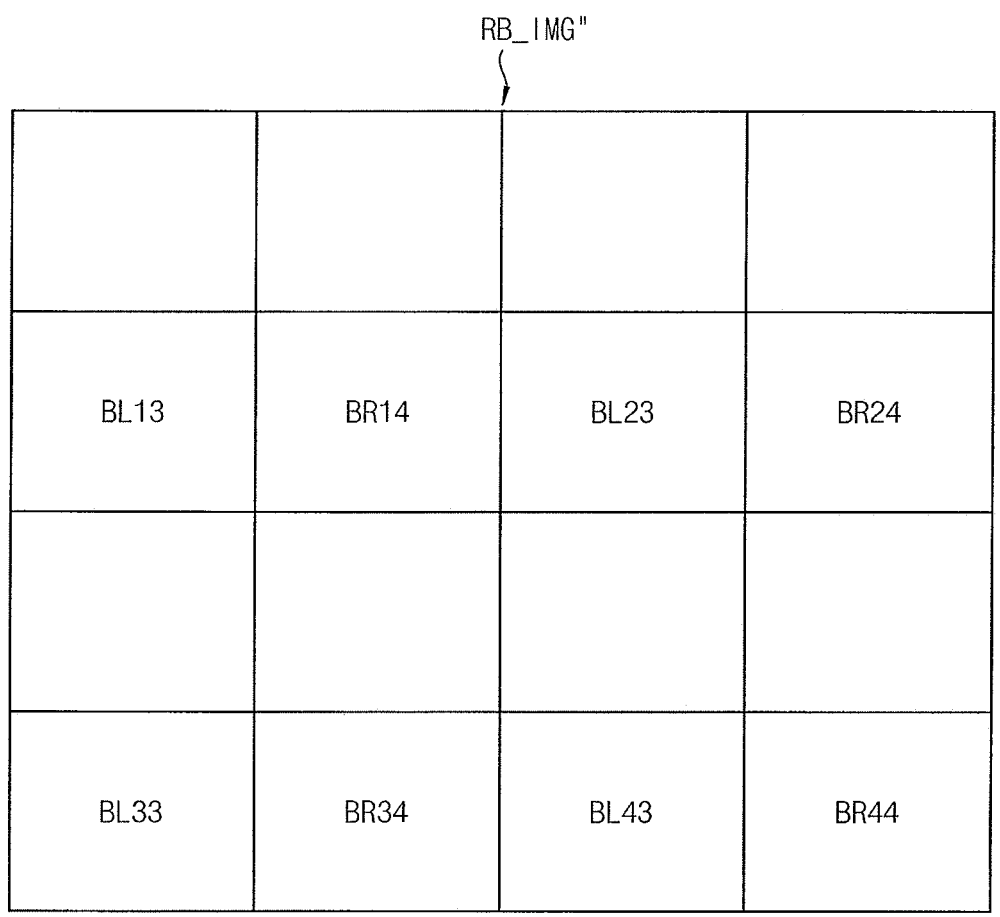

Referring to FIGS. 15A and 15B, a raw blue image RB IMG" may be obtained using the blue pixels B11", B12", B21", B22", B31", B32", B41" and B42" included in the pixel array 100c.

For example, blue signals BL13, BL23, BL33 and BL43 may be obtained from the blue pixels B11", B21", B31" and B41", respectively, and blue signals BR14, BR24, BR34 and BR44 may be obtained from the blue pixels B12", B22", B32" and B42", respectively. In FIG. 15B, a blue signal labeled "BL" and a blue signal labeled "BR" represent a signal generated using a blue pixel arranged on the left side and a signal generated using a blue pixel arranged on the right side with respect to the center of each microlens, respectively.

Referring to FIGS. 15B and 15C, a first partial blue image PB_IMG1" including only the blue signals BL13, BL23, BL33, and BL43 and a second partial blue image PB_IMG2" including only the blue signals BR14, BR24, BR34, and BR44 may be obtained by separating the raw blue image RB IMG".

Figure 15D:
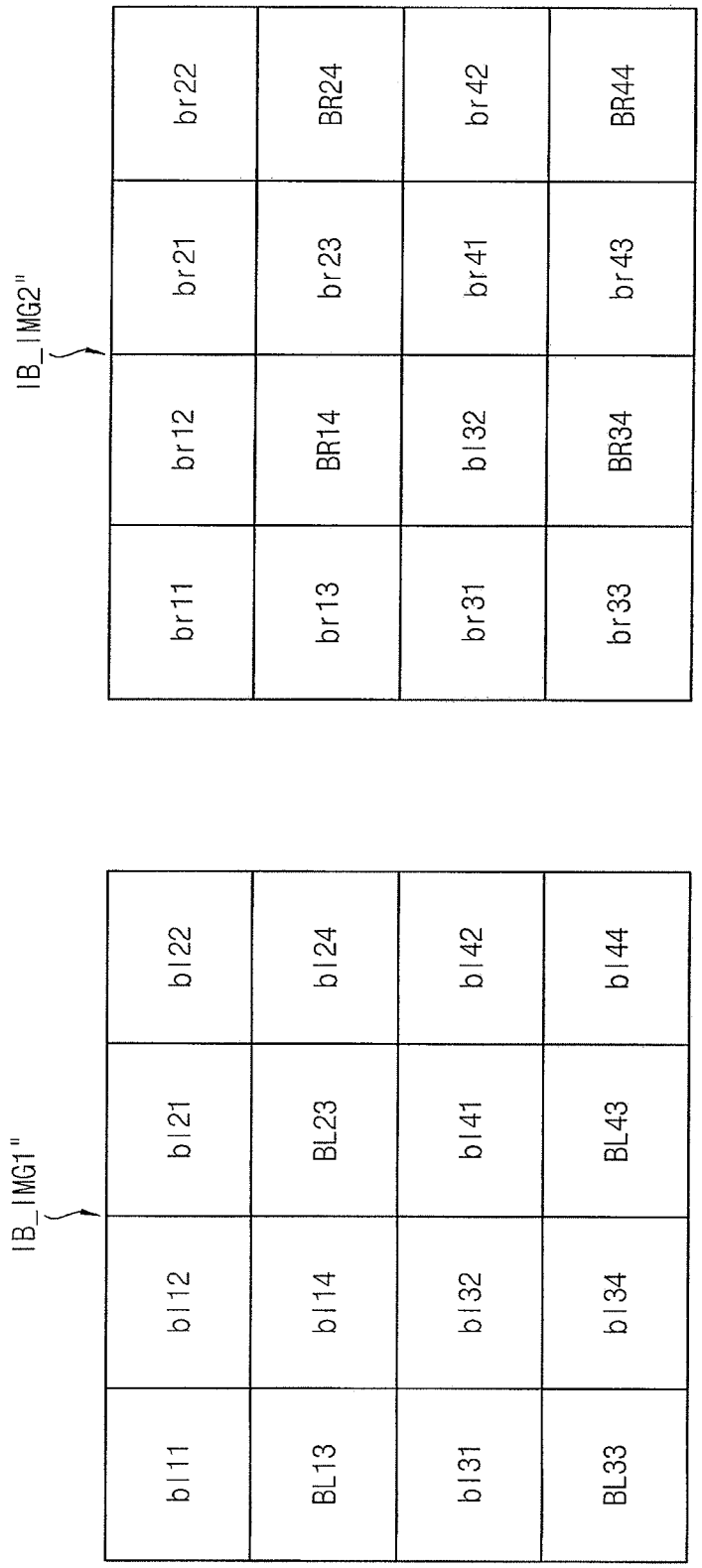

Referring to FIGS. 15C and 15D, a first interpolated blue image IB_IMG1" including the blue signals BL13, BL23, BL33 and BL43 and interpolated blue signals bl11, bl12, bl14, bl21, bl22, bl24, bl31, bl32, bl34, bl41, bl42 and bl44 and a second interpolated blue image IB_IMG2" including the blue signals BR14, BR24, BR34 and BR44 and interpolated blue signals br11, br12, br13, br21, br22, br23, br31, br32, br33, br41, br42 and br43 may be generated by performing the interpolation on the first partial blue image PB_IMG1" and the second partial blue image PB_IMG2", respectively, based on the green image.

Referring to FIGS. 15D and 15E, a first blue composite image TB_IMG1" including blue composite signals BT11, BT12, BT13, BT14, BT21, BT22, BT23, BT24, BT31, BT32, BT33, BT34, BT41, BT42, BT43 and BT44 may be generated by summing the first and second interpolated blue images IB_IMG1" and IB_IMG2". The first blue composite image TB_IMG1" may be output as the blue image.

A blue compensated image and a second blue composite image may be additionally generated, and the second blue composite image may be output as the blue image. In addition, the red image may be generated in the same manner as the blue image.

Although example embodiments are described based on a specific number of pixel groups, a specific number of subpixels and specific color arrangements, example embodiments may be applied to various examples including any number of pixel groups, any number of subpixels and any color arrangements. In addition to the color information, subpixels may be implemented to detect various other information, e.g., infrared (IR) signals, etc.

Figure 16:
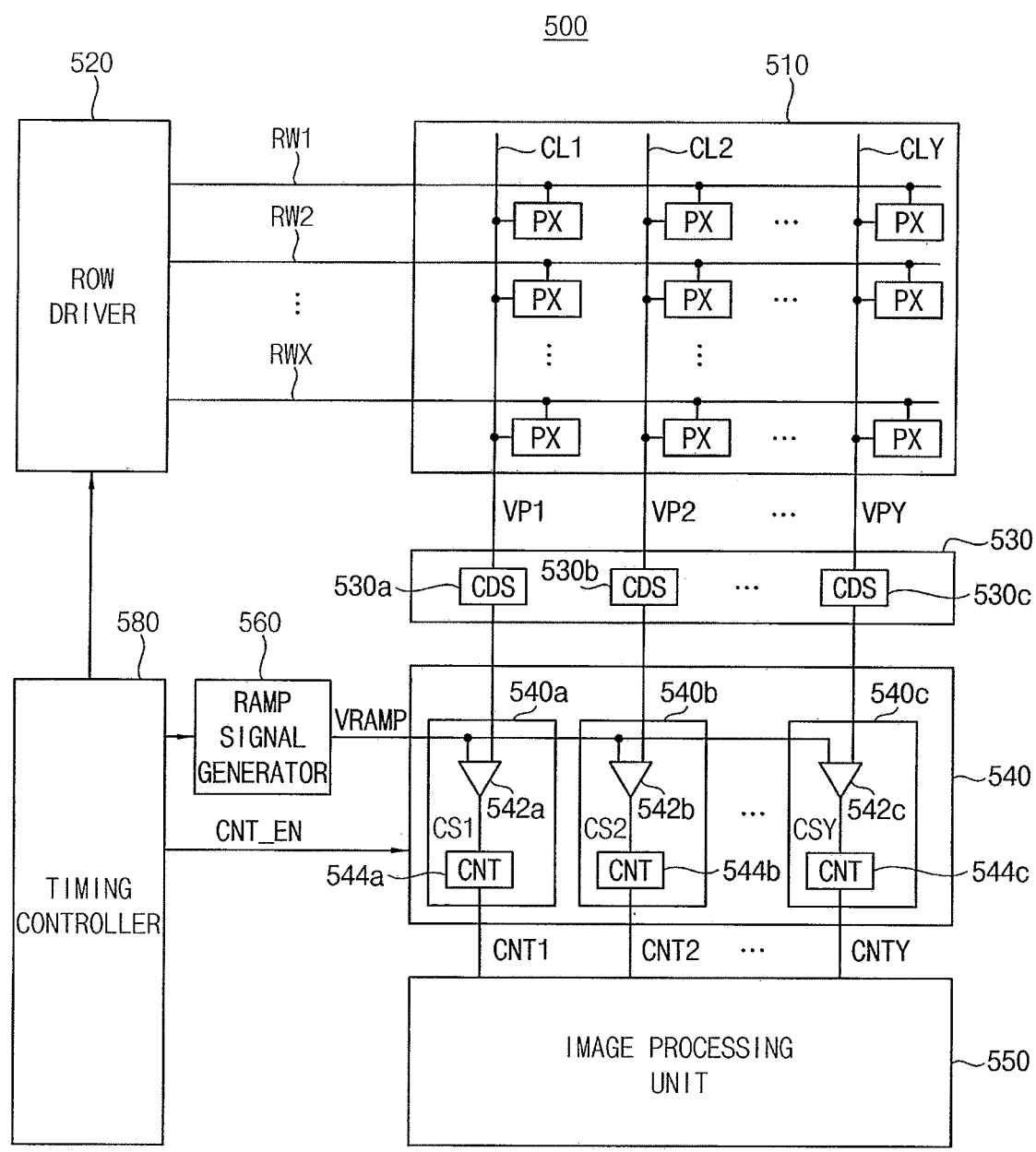
FIG. 16 illustrates an image sensor according to example embodiments.

FIG. 16 illustrates an image sensor according to example embodiments. Referring to FIG. 16, an image sensor 500 includes a pixel array 510, a correlated double sampling (CDS) block 530 and an analog-to-digital conversion (ADC) block 540. The image sensor 500 may further include a row driver 520, an image processing unit 550, a ramp signal generator 560 and a timing controller 580.

In some example embodiments, the image sensor 500 may be classified as a front side illumination (FSI) image sensor or a backside illumination (BSI) image sensor depending on whether a light receiving surface is the front or back side of a substrate.

The pixel array 510 includes a plurality of subpixels or unit pixels PX arranged in a matrix. Each of the plurality of unit pixels PX may be connected to a respective one of a plurality of rows RW1, RW2, . . . , RWX and a respective one of a plurality of columns CL1, CL2, . . . , CLY, where each of X and Y is a natural number greater than or equal to two. The pixel array 510 generates a plurality of analog pixel signals VP1, VP2, . . . , VPY based on incident light. The pixel array 510 may be a pixel array according to example embodiments described with reference to FIGS. 1 through 15.

The row driver 520 may be connected to the plurality of rows RW1~RWX of the pixel array 510. The row driver 520 may generate driving signals to drive the plurality of rows RW1~RWX. For example, the row driver 520 may drive the plurality of unit pixels PX included in the pixel array 510 row by row.

The correlated double sampling block 530 may include a plurality of correlated double sampling circuits (CDSs) 530a, 530b, . . . , 530c. The plurality of correlated double sampling circuits 530a-530c may be connected to the plurality of columns CL1~CLY of the pixel array 510. The plurality of correlated double sampling circuits 530a~530c may perform a correlated double sampling operation on the plurality of analog pixel signals VP1~VPY output from the pixel array 510.

The analog-to-digital conversion block 540 includes a plurality of analog-to-digital converters 540a, 540b, . . . , 540c. The plurality of analog-to-digital converters 540a~540c are connected to the plurality of columns CL1~CLY of the pixel array 510 via the plurality of correlated double sampling circuits 530a~530c. The plurality of analog-to-digital converters 540a~540c perform a column analog-to-digital conversion operation that converts the plurality of analog pixel signals VP1~VPY (e.g., a plurality of correlated double sampled analog pixel signals output from the plurality of correlated double sampling circuits 530a~530c) into a plurality of digital signals CNT1, CNT2, ..., CNTY in parallel (e.g., simultaneously or concurrently).

Each of the plurality of analog-to-digital converters 540a-540c may include a respective one of a plurality of comparators 542a, 542b, ..., 542c and a respective one of a plurality of counters (CNTs) 544a, 544b, ..., 544c. For example, the first analog-to-digital converter 540a may include the first comparator 542a and the first counter 544a. The first comparator 542a may compare the first analog pixel signal VP1 (e.g., the correlated double sampled first analog pixel signal output from the first correlated double sampling circuit 530a) with a ramp signal VRAMP to generate a first comparison signal CS1. The first counter 544a may count a level transition timing of the first comparison signal CS1 to generate the first digital signal CNT1.

Operations of the correlated double sampling block 530 and the analog-to-digital conversion block 540 may be performed on the plurality of unit pixels PX included in the pixel array 510 row by row.

The plurality of correlated double sampling circuits 530a~530c and the plurality of analog-to-digital converters 540a~540c may form a plurality of column driving circuits. For example, the first correlated double sampling circuit 530a and the first analog-to-digital converter 540a may form a first column driving circuit.

The image processing unit 550 may perform an image processing operation based on the plurality of digital signals CNT1~CNTY. For example, the image processing algorithms described with reference to FIGS. 4, 5, and 7 may be performed by the image processing unit 550.

Figure 18:
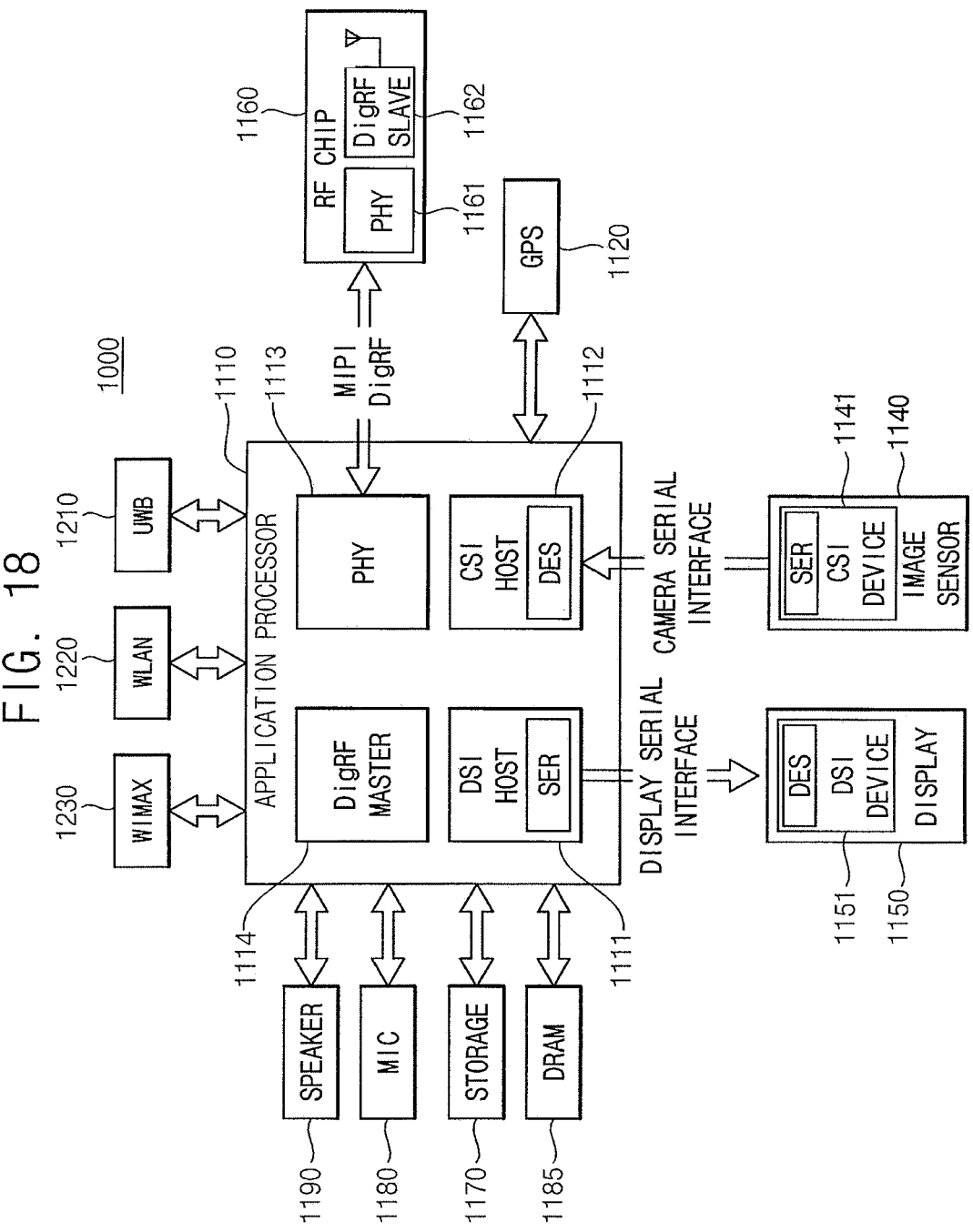
FIG. 18 illustrates an electronic system including an image sensor according to example embodiments.

In some example embodiments, the image processing unit 550 may be omitted, and the above-described image processing operation may be performed by an external processor (e.g., an application processor 1110 in FIG. 18).

The ramp signal generator 560 may generate the ramp signal VRAMP. The timing controller 580 may control overall operation timings of the image sensor 500, and may generate control signals including a count enable signal CNT_EN, a clock signal (not shown), etc.

Figure 17:
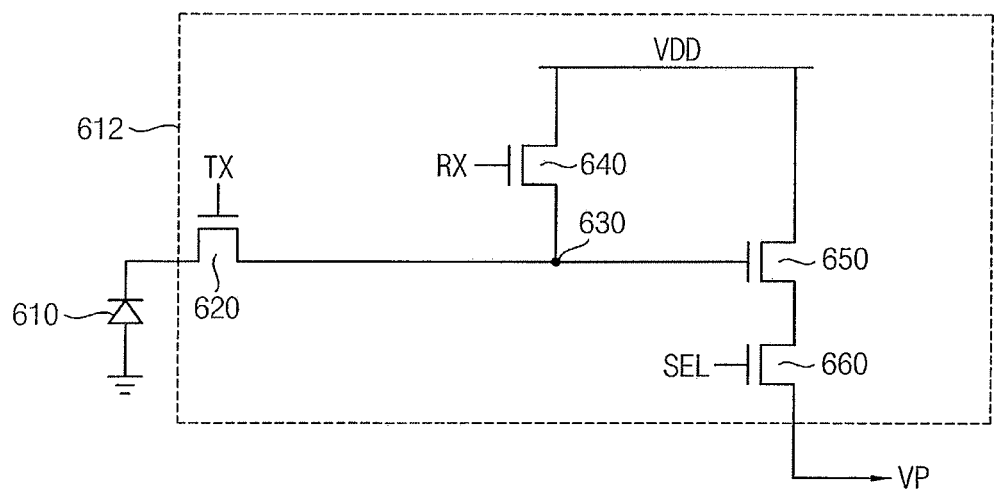
FIG. 17 illustrates a circuit diagram of an example of a unit pixel included in an image sensor according to example embodiments.

FIG. 17 is a circuit diagram illustrating an example of a unit pixel included in an image sensor according to example embodiments. Referring to FIG. 17, a unit pixel 600 may include a photoelectric conversion unit 610 and a signal generation unit 612.

The photoelectric conversion unit 610 may perform a photoelectric conversion operation. For example, the photoelectric conversion unit 610 may convert the incident light into photo-charges during an integration mode. If an image sensor including the unit pixel 600 is a CMOS image sensor, image information on an object to be captured may be obtained by collecting charge carriers (e.g., electron-hole pairs) in the photoelectric conversion unit 610 proportional to intensity of the incident light through an open shutter of the CMOS image sensor during the integration mode.

The signal generation unit 612 may generate an electric signal (e.g., an analog pixel signal VP) based on the photo-charges generated by the photoelectric conversion operation during a readout mode. If the image sensor including the unit pixel 600 is the CMOS image sensor, the shutter may be closed, and the analog pixel signal VP may be generated based on the image information in a form of the charge carriers during the readout mode after the integration mode. For example, as illustrated in FIG. 17, the unit pixel 600 may have four-transistor structure including four transistors.

For example, the signal generation unit 612 may include a transfer transistor 620, a reset transistor 640, a drive transistor 650, a selection transistor 660 and a floating diffusion node 630. The transfer transistor 620 may be connected between the photoelectric conversion unit 610 and the floating diffusion node 630, and may include a gate electrode receiving a transfer signal TX. The reset transistor 640 may be connected between a power supply voltage VDD and the floating diffusion node 630, and may include a gate electrode receiving a reset signal RX. The drive transistor 650 may be connected between the power supply voltage VDD and the selection transistor 660, and may include a gate electrode connected to the floating diffusion node 630. The selection transistor 660 may be connected between the drive transistor 650 and an output terminal outputting the analog pixel signal VP, and may include a gate electrode receiving a selection signal SEL. One signal generation unit may be shared by a plurality of photoelectric conversion units.

FIG. 18 illustrates an electronic system including an image sensor according to example embodiments. Referring to FIG. 18, an electronic system 1000 may be implemented as a data processing device that uses or supports a mobile industry processor interface (MIPI) interface. The electronic system 1000 may include an application processor 1110, an image sensor 1140, a display device 1150, etc. The electronic system 1000 may further include a radio frequency (RF) chip 1160, a global positioning system (GPS) 1120, a storage 1170, a microphone (MIC) 1180, a dynamic random access memory (DRAM) 1185 and a speaker 1190. In addition, the electronic system 1000 may perform communications using an ultrawideband (UWB) 1210, a wireless local area network (WLAN) 1220, a worldwide interoperability for microwave access (WIMAX) 1230, etc.

The application processor 1110 may be a controller or a processor that controls an operation of the image sensor 1140. The image sensor 1140 may be the image sensor according to example embodiments.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of a radio frequency (RF) chip 1160 based on a mobile industry processor interface (MIPI) DigRF, and a DigRF MASTER 1114 that controls the data communications of the physical layer 1161. A DigRF SLAVE 1162 of the RF chip 1160 may be controlled through the DigRF MASTER 1114.

In some example embodiments, the DSI host 1111 may include a serializer (SER), and the DSI device 1151 may include a deserializer (DES). In some example embodiments, the CSI host 1112 may include a deserializer (DES), and the CSI device 1141 may include a serializer (SER).

Embodiments may be applied to various electronic devices and systems including the image sensors. For example, embodiments may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

By way of summation and review, in the pixel array, the image sensor and the electronic system according to example embodiments, a plurality of subpixels included in one pixel group share one microlens, and thus different signals (e.g., signals of different colors) may be substantially simultaneously or concurrently obtained at one point on the object. In addition, neighboring pixel groups may have different subpixel patterns, and thus a normal image may be efficiently obtained regardless of the focus state or the position error of the microlenses.

At least one example embodiment of the present disclosure provides a pixel array included in an image sensor capable of efficiently obtaining a normal image regardless of a focus state or a positional error of a microlens. At least one example embodiment of the present disclosure provides an image sensor including the pixel array. At least one example embodiment of the present disclosure provides an electronic system including the image sensor.

Embodiments are described, and illustrated in the drawings, in terms of functional blocks, units, modules, and/or methods. Those skilled in the art will appreciate that these blocks, units, modules, and/or methods are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, modules, and/or methods being implemented by microprocessors or similar, they may be programmed using software (e.g., microcode) to perform various functions discussed herein and may optionally be driven by firmware and/or software. Alternatively, each block, unit, module, and/or method may be implemented by dedicated hardware, or as a combination of dedicated hardware to perform some functions and a processor (e.g., one or more programmed microprocessors and associated circuitry) to perform other functions. Also, each block, unit, and/or module of the embodiments may be physically separated into two or more interacting and discrete blocks, units and/or modules without departing from the scope of the disclosure. Further, the blocks, units and/or modules of the embodiments may be physically combined into more complex blocks, units and/or modules without departing from the scope of the disclosure.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A pixel array, comprising:
    a first pixel group including:
        a plurality of first subpixels adjacent to each other and arranged in a first pattern, the plurality of first subpixels including a first green pixel and a second green pixel; and
        a first microlens shared by the plurality of first subpixels;
    a second pixel group adjacent to the first pixel group, the second pixel group including:
        a plurality of second subpixels adjacent to each other and arranged in a second pattern different from the first pattern, the plurality of second subpixels including a third green pixel and a fourth green pixel; and
        a second microlens shared by the plurality of second subpixels;
    a third pixel group adjacent to the first pixel group, the third pixel group including:
        a plurality of third subpixels adjacent to each other and arranged in a third pattern different from the first and second patterns, the plurality of third subpixels including a fifth green pixel and a sixth green pixel; and
        a third microlens shared by the plurality of third subpixels; and
    a fourth pixel group adjacent to the second and third pixel groups, the fourth pixel group including:
        a plurality of fourth subpixels adjacent to each other and arranged in a fourth pattern different from the first, second, and third patterns, the plurality of fourth subpixels including a seventh green pixel and an eighth green pixel; and
        a fourth microlens shared by the plurality of fourth subpixels, wherein:
    a first green signal is generated using the first and second green pixels arranged in a first arrangement,
    a second green signal is generated using the third and fourth green pixels arranged in a second arrangement different from the first arrangement,
    a third green signal is generated using the fifth and sixth green pixels arranged in the second arrangement,
    a fourth green signal is generated using the seventh and eighth green pixels arranged in the first arrangement,
    a first green partial image includes the first and fourth green signals,
    a second green partial image includes the second and third green signals,
    a first green interpolated image is generated by performing an interpolation on the first green partial image,
    a second green interpolated image is generated by performing the interpolation on the second green partial image, and
    a first green composite image generated by averaging the first and second green interpolated images is output as a green image.

2. The pixel array as claimed in claim 1, wherein:
    the plurality of first subpixels includes the first green pixel, the second green pixel, a first red pixel, and a first blue pixel in a 2*2 matrix having the first pattern,
    the plurality of second subpixels includes the third green pixel, the fourth green pixel, a second red pixel, and a second blue pixel in a 2*2 matrix having the second pattern,
    the plurality of third subpixels includes the fifth green pixel, the sixth green pixel, a third red pixel, and a third blue pixel in a 2*2 matrix having the third pattern, and
    the plurality of fourth subpixels includes the seventh green pixel, the eighth green pixel, a fourth red pixel, and a fourth blue pixel in a 2*2 matrix having the fourth pattern.

3. The pixel array as claimed in claim 2, wherein a first location of the first red pixel in the first pixel group, a second location of the second red pixel in the second pixel group, a third location of the third red pixel in the third pixel group, and a fourth location of the fourth red pixel in the fourth pixel group are different from each other.

4. The pixel array as claimed in claim 2, wherein the second, fourth, fifth, and seventh green pixels are adjacent to each other.

5. The pixel array as claimed in claim 4, wherein one green signal is output by averaging green signals obtained from the second, fourth, fifth, and seventh green pixels.

6. The pixel array as claimed in claim 2, wherein:
a red image is generated using the green image and the first, second, third, and fourth red pixels,
a blue image is generated using the green image and the first, second, third, and fourth blue pixels, and
an output image is generated using the green, red, and blue images.

7. The pixel array as claimed in claim 6, wherein:
the second green partial image is additionally used to generate the first green interpolated image, and
the first green partial image is additionally used to generate the second green interpolated image.

8. The pixel array as claimed in claim 6, wherein:
a green compensated image includes gain-compensated first, second, third and fourth green signals obtained by multiplying the first, second, third and fourth green signals by gain compensation values, and
a second green composite image generated by summing the first green composite image with a first weight and the green compensated image with a second weight is output as the green image.

9. The pixel array as claimed in claim 6, wherein:
a first red partial image including a first red signal from the first red pixel, a second red partial image including a second red signal from the second red pixel, a third red partial image including a third red signal from the third red pixel, and a fourth red partial image including a fourth red signal from the fourth red pixel are obtained,
a first red interpolated image is generated by performing an interpolation on the first red partial image based on the green image,
a second red interpolated image is generated by performing the interpolation on the second red partial image based on the green image,
a third red interpolated image is generated by performing the interpolation on the third red partial image based on the green image,
a fourth red interpolated image is generated by performing the interpolation on the fourth red partial image based on the green image, and
a first red composite image generated by summing the first, second, third and fourth red interpolated images is output as the red image.

10. An image sensor, comprising:
the pixel array as claimed in claim 1 to generate a plurality of analog pixel signals based on incident light; and
a plurality of column driving circuits connected to a plurality of columns of the pixel array and to convert the plurality of analog pixel signals into a plurality of digital signals.

11. An electronic system, comprising:
an image sensor including the pixel array as claimed in claim 1 and configured to generate a plurality of digital signals based on incident light; and
a processor configured to control an operation of the image sensor.

12. A pixel array, comprising:
a first pixel group including:
a plurality of first subpixels adjacent to each other and arranged in a first pattern; and
a first microlens shared by the plurality of first subpixels;
a second pixel group adjacent to the first pixel group, the second pixel group including:
a plurality of second subpixels adjacent to each other and arranged in a second pattern different from the first pattern; and
a second microlens shared by the plurality of second subpixels;
a third pixel group adjacent to the first pixel group, the third pixel group including:
a plurality of third subpixels adjacent to each other and arranged in a third pattern different from the first and second patterns; and
a third microlens shared by the plurality of third subpixels; and
a fourth pixel group adjacent to the second and third pixel groups, the fourth pixel group including:
a plurality of fourth subpixels adjacent to each other and arranged in a fourth pattern different from the first, second, and third patterns; and
a fourth microlens shared by the plurality of fourth subpixels, wherein:
the plurality of first subpixels include a first green pixel, a first red pixel, a first blue pixel and a first white pixel arranged in a 2*2 matrix formation having the first pattern,
the plurality of second subpixels include a second green pixel, a second red pixel, a second blue pixel and a second white pixel arranged in a 2*2 matrix formation having the second pattern,
the plurality of third subpixels include a third green pixel, a third red pixel, a third blue pixel and a third white pixel arranged in a 2*2 matrix formation having the third pattern,
the plurality of fourth subpixels include a fourth green pixel, a fourth red pixel, a fourth blue pixel and a fourth white pixel arranged in a 2*2 matrix formation having the fourth pattern,
a first green partial image including a first green signal from the first green pixel and a fourth green signal from the fourth green pixel, and a second green partial image including a second green signal from the second green pixel and a third green signal from the third green pixel are obtained,
a first green interpolated image is generated by performing an interpolation on the first green partial image,
a second green interpolated image is generated by performing the interpolation on the second green partial image, and
a first green composite image generated by summing the first and second green interpolated images is output as a green image.

13. A pixel array, comprising:
a first pixel group including:
a plurality of first subpixels adjacent to each other and arranged in a first pattern; and
a first microlens shared by the plurality of first subpixels;
a second pixel group adjacent to the first pixel group, the second pixel group including:
a plurality of second subpixels adjacent to each other and arranged in a second pattern different from the first pattern; and
a second microlens shared by the plurality of second subpixels;

a third pixel group adjacent to the first pixel group, the third pixel group including:
  a plurality of third subpixels adjacent to each other and arranged in a third pattern different from the first and second patterns; and
  a third microlens shared by the plurality of third subpixels; and
a fourth pixel group adjacent to the second and third pixel groups, the fourth pixel group including:
  a plurality of fourth subpixels adjacent to each other and arranged in a fourth pattern different from the first, second, and third patterns; and
  a fourth microlens shared by the plurality of fourth subpixels, wherein:
the plurality of first subpixels include a first green pixel and a first red pixel arranged in the first pattern,
the plurality of second subpixels include a second green pixel and a second red pixel arranged in the second pattern,
the plurality of third subpixels include a third green pixel and a first blue pixel arranged in the third pattern,
the plurality of fourth subpixels include a fourth green pixel and a second blue pixel arranged in the fourth pattern,
a first green partial image including a first green signal from the first green pixel and a fourth green signal from the fourth green pixel, and a second green partial image including a second green signal from the second green pixel and a third green signal from the third green pixel are obtained,
a first green interpolated image is generated by performing an interpolation on the first green partial image,
a second green interpolated image is generated by performing the interpolation on the second green partial image, and
a first green composite image generated by summing the first and second green interpolated images is output as a green image.

14. The pixel array as claimed in claim 13, wherein:
a first location of the first green pixel in the first pixel group is different from a second location of the second green pixel in the second pixel group,
a third location of the third green pixel in the third pixel group is the same as the second location, and
a fourth location of the fourth green pixel in the fourth pixel group is the same as the first location.

15. The pixel array as claimed in claim 13, wherein:
a red image is generated using the green image and the first and second red pixels,
a blue image is generated using the green image and the first and second blue pixels, and
an output image is generated using the green, red and blue images.

16. The pixel array as claimed in claim 15, wherein:
a green compensated image including gain-compensated first, second, third, and fourth green signals is additionally obtained by multiplying the first, second, third, and fourth green signals by gain compensation values, and
a second green composite image generated by summing the first green composite image with a first weight and the green compensated image with a second weight is output as the green image.

17. The pixel array as claimed in claim 15, wherein:
a first blue partial image including a first blue signal from the first blue pixel, and a second blue partial image including a second blue signal from the second blue pixel are obtained,
a first blue interpolated image is generated by performing an interpolation on the first blue partial image based on the green image,
a second blue interpolated image is generated by performing the interpolation on the second blue partial image based on the green image, and
a first blue composite image generated by summing the first and second blue interpolated images is output as the blue image.

* * * * *